(12) United States Patent
Nazi et al.

(10) Patent No.: US 10,824,592 B2
(45) Date of Patent: Nov. 3, 2020

(54) DATABASE MANAGEMENT USING HYPERLOGLOG SKETCHES

(71) Applicant: Microsoft Technology Licensing, LLC, Redmond, WA (US)

(72) Inventors: Azade Nazi, Bellevue, WA (US); Bolin Ding, Redmond, WA (US); Vivek R Narasayya, Redmond, WA (US); Surajit Chaudhuri, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 175 days.

(21) Appl. No.: 16/008,685

(22) Filed: Jun. 14, 2018

(65) Prior Publication Data

US 2019/0384830 A1 Dec. 19, 2019

(51) Int. Cl.
| | |
|---|---|
| *G06F 16/13* | (2019.01) |
| *G06F 17/18* | (2006.01) |
| *G06F 7/36* | (2006.01) |
| *G06F 16/23* | (2019.01) |
| *G06F 16/901* | (2019.01) |

(52) U.S. Cl.
CPC .............. *G06F 16/137* (2019.01); *G06F 7/36* (2013.01); *G06F 16/23* (2019.01); *G06F 16/901* (2019.01); *G06F 17/18* (2013.01)

(58) Field of Classification Search
CPC ..................................................... G06F 16/137
USPC ......................................................... 707/661
See application file for complete search history.

(56) References Cited

U.S. PATENT DOCUMENTS

| | | | | |
|---|---|---|---|---|
| 2014/0379693 | A1* | 12/2014 | May ................. | G06F 16/24545 707/718 |
| 2015/0261750 | A1* | 9/2015 | Blaas ................. | G06F 16/2255 707/692 |
| 2015/0269178 | A1* | 9/2015 | Rhodes ................. | G06F 16/958 707/700 |
| 2016/0055205 | A1* | 2/2016 | Jonathan ........... | G06F 16/24537 707/714 |
| 2018/0068023 | A1* | 3/2018 | Douze ................. | G06F 16/9535 |
| 2018/0300363 | A1* | 10/2018 | Ertl ........................ | G06N 7/005 |

OTHER PUBLICATIONS

Beyer, et al., "On Synopses for Distinct-Value Estimation Under Multiset Operations", Proceedings of the ACM SIGMOD international conference on Management of data, Jun. 11, 2007, pp. 199-210.

(Continued)

*Primary Examiner* — Syling Yen
(74) *Attorney, Agent, or Firm* — Schwegman Lundberg & Woessner, P.A.

(57) ABSTRACT

Generally discussed herein are devices, systems, and methods for database management. A method may include determining a first hyperloglog (HLL) sketch of a first column of data, determining a second HLL sketch of a second column of data, estimating an inclusion coefficient based on the first and second HLL sketches, and performing operations on the first column of data or the second column of data in response to determining the inclusion coefficient is greater than, or equal to, a specified threshold.

18 Claims, 9 Drawing Sheets

(56) References Cited

OTHER PUBLICATIONS

Chen, et al., "Fast foreign-key detection in microsoft sql server powerpivot for excel", In Proceedings of the VLDB Endowment, vol. 7, Issue 13, Aug. 2014, pp. 1417-1428.
Cohen, et al., "Summarizing data using bottom-k sketches", In Proceedings of the twenty-sixth annual ACM symposium on Principles of distributed computing, Aug. 12, 2007, pp. 225-234.
Flajolet, et al., "Hyperloglog: The analysis of a near-optimal cardinality estimation algorithm", In Proceedings of the international conference on analysis of algorithms, Jun. 2007, pp. 127-146.
Rostin, et al., "A machine learning approach to foreign key discovery", In Proceedings of 12th International Workshop on the Web and Databases, Jun. 28, 2009, 6 Pages.
Zhang, et al., "On multi-column foreign key discovery", In Proceedings of the VLDB Endowment, vol. 3, Issue 1-2, Sep. 2010, pp. 805-814.

* cited by examiner

DATABASE MANAGEMENT USING HYPERLOGLOG SKETCHES

BACKGROUND

Inclusion coefficient estimates may be used in a database system to determine what fraction of data values of a column in a dataset are in another column of the dataset. Inclusion coefficient estimates may be useful for several types of tasks, such as foreign-key detection, data profiling, and data integration. An exact inclusion coefficient calculation may be prohibitively resource consuming, error prone, or difficult to compute.

Prior inclusion coefficient estimators may use a Bottom-k sketch on each column of a table. Bottom-k sketches have high accuracy for inclusion coefficient estimation when the number of distinct values in both a first column, X, and a second column, Y, are smaller than k, a given memory budget. This is at least partially because the Bottom-k sketches effectively behave like hash tables of the respective columns.

However, as may be shown empirically, one limitation of using a Bottom-k sketch for estimating an inclusion coefficient is that, for a given memory budget (of k values), as the cardinality (number of distinct values) of column X or Y increases beyond k, the estimation error becomes larger. Another limitation of a Bottom-k sketch is that they are not amenable to incremental maintenance in situations where data is deleted. For instance, in data warehousing scenarios, it is not uncommon for recent data to be added and older data to be removed from the database. Bottom-k sketches are computationally expensive to maintain when data is deleted from a column for which a Bottom-k sketch has been computed.

SUMMARY

This summary section is provided to introduce aspects of embodiments in a simplified form, with further explanation of the embodiments following in the detailed description. This summary section is not intended to identify essential or required features of the claimed subject matter, and the combination and order of elements listed in this summary section are not intended to provide limitation to the elements of the claimed subject matter.

A system for managing database data comprising at least one database including a first column of data and a second column of data stored thereon, database management circuitry to receive the first and second columns of data, determine a first hyperloglog (HLL) sketch of a first column of data, determine a second HLL sketch of a second column of data, estimate an inclusion coefficient based on the first and second HLL sketches, and perform operations on the first column of data or the second column of data of the database in response to a determination the inclusion coefficient is greater than, or equal to, a specified threshold.

A (non-transitory) machine-readable medium including instructions stored thereon that, when executed by a machine, configure the machine to perform operations comprising receiving a first hyperloglog (HLL) sketch of a first column of data, receiving a second HLL sketch of a second column of data, estimating an inclusion coefficient based on the first and second HLL sketches, and performing operations on the first column of data or the second column of data in response to determining the inclusion coefficient is greater than, or equal to, a specified threshold.

A method of database management, the method can include determining a first hyperloglog (HLL) sketch of a first column of data, determining a second HLL sketch of a second column of data, estimating an inclusion coefficient based on the first and second HLL sketches, detecting, using the determined inclusion coefficient, a foreign key, and joining the second column of data to a table including the foreign key and of which the first column is a part.

DETAILED DESCRIPTION

Figure 1:
FIG. 1 illustrates, by way of example, an embodiment of a diagram of method for generating an HLL sketch.

In the following description, reference is made to the accompanying drawings that form a part hereof, and in which is shown by way of illustration specific embodiments which may be practiced. These embodiments are described in sufficient detail to enable those skilled in the art to practice the embodiments. It is to be understood that other embodiments may be utilized and that structural, logical, and/or electrical changes may be made without departing from the scope of the embodiments. The following description of embodiments is, therefore, not to be taken in a limited sense, and the scope of the embodiments is defined by the appended claims.

The operations, functions, or methods described herein may be implemented in software in some embodiments. The software may include computer executable instructions stored on computer or other machine-readable media or storage device, such as one or more non-transitory memories (e.g., a non-transitory machine-readable medium) or other type of hardware based storage devices, either local or networked. Further, such functions may correspond to subsystems, which may be software, hardware, firmware or a combination thereof. Multiple functions may be performed in one or more subsystems as desired, and the embodiments described are merely examples. The software may be executed on a digital signal processor, ASIC, microprocessor, central processing unit (CPU), graphics processing unit (GPU), field programmable gate array (FPGA), or other type of processor operating on a computer system, such as a personal computer, server or other computer system, turning such computer system into a specifically programmed machine. The functions or algorithms may be implemented using processing circuitry, such as may include electric and/or electronic components (e.g., one or more transistors, resistors, capacitors, inductors, amplifiers, modulators, demodulators, antennas, radios, regulators, diodes, oscillators, multiplexers, logic gates, buffers, caches, memories, GPUs, CPUs, FPGAs, ASICs, or the like).

Prior inclusion coefficient estimation techniques are more inaccurate as a number of distinct values (sometimes referred to as a cardinality) in a first or second column of data is greater than a given memory budget, k. Embodiments herein provide a technique that improves the accuracy in instances in which one or more of the columns of data have cardinalities greater than k, and retain about the same accuracy as other techniques of estimating an inclusion coefficient when the cardinalities are smaller.

Efficiently estimating the inclusion coefficient is useful for many tasks, such as data profiling and foreign-key detection. Embodiments include a new inclusion coefficient estimator binomial mean lookup (BML). Embodiments may use a Hyperloglog (HLL) sketch, an algorithm for approximating the number of distinct elements in multiple sets, to estimate the inclusion coefficient. Embodiments may have significantly lower error compared to current state-of-the art approaches, including Bottom-k sketches. The error was estimated using experiments on industry benchmarks, such as transaction processing performance council TPC-H and TPC-DS, and several "real-world" databases. This disclosure further describes how embodiments may be maintained incrementally with data deletions using a small amount of additional memory.

The inclusion dependencies in a dataset may be an important attribute of data profiling efforts. However, due to issues in data quality, such as missing values or multiple representations of the same value, it may be helpful to relax a requirement of exact containment. Thus, an inclusion coefficient may be helpful in computing the fraction of values of one column that are contained in another column. When the database schema and data sizes are large, computing the inclusion coefficient for many pairs of columns in a database may be both computationally expensive and memory intensive.

One approach for addressing this challenge is to estimate the inclusion coefficient using only bounded-memory sketches (sketches that consume at most a pre-defined limit of memory space) of the data. Given a fixed budget of memory per column, these techniques scan the data (e.g., only once), and compute a data sketch that fits within the memory budget. For a given pair of columns X and Y, the inclusion coefficient $\varphi(X, Y)$ may then be estimated using only the sketches on columns X and Y.

One approach to determining an inclusion coefficient is to build a Bottom-k sketch on each column, and develop an inclusion coefficient estimator using these sketches. A Bottom-k sketch is a sketch of data that is used for later processing. A Bottom-k sketch is obtained by associating with each item in a ground set an independent random rank drawn from a probability distribution that depends on the weight of the item and including the k items with smallest rank value. Bottom-k sketches have high accuracy for inclusion coefficient estimation when the number of distinct values in both X and Y are smaller than k, since the sketches effectively behave like hash tables of the respective columns. However, as may be shown empirically, one limitation of using Bottom-k sketches for estimating an inclusion coefficient is that, for a given memory budget (of k values), as the cardinality of column X or Y increases beyond k, the estimation error becomes prohibitively large. Additionally, Bottom-k sketches are not amenable to incremental maintenance in situations where data is deleted. For example, in data warehousing scenarios, it is not uncommon for data to be added to the database or data to be removed from the database.

Developing an estimator with low error for inclusion coefficient estimation, using bounded-memory sketches, is challenging. This at least in part because a theoretical hardness result (discussed elsewhere herein) shows that any estimator that relies only on sketches with bounded memory must incur unbounded error in certain cases. At least some of the difficult cases are when column X has small cardinality and column Y has large cardinality or vice-versa. These difficult cases appear to be quite common in databases.

Embodiments include a new estimator for inclusion coefficient BML based on HLL sketches. HLL sketches may be computed efficiently and within a given memory budget, requiring invocation of only a single hash function for each value in the column. HLL sketches may be used for estimating cardinality. A theoretical result is provided that establishes a mapping from the inclusion coefficient $\varphi(X, Y)$ to the probability that the value of a bucket in the HLL sketch of column Y is greater than the value of the corresponding bucket in the HLL sketch of column X BML may be based on maximum likelihood estimation (MLE) method. BML may return the value of $\varphi(X; Y)$ that maximizes the likelihood of the number of buckets in the HLL sketch of column Y whose HLL value is greater than the HLL value of the corresponding bucket in column X. Embodiments may provide a bound on the error. This error bound is data-dependent, such that it is specific to the pair of columns X and Y. Such an error bound may be valuable to applications that consume the estimates.

In embodiments, HLL sketches may be maintained incrementally in the presence of insertions. Embodiments may include a technique for incrementally maintaining an HLL sketch in the presence of data deletions, such as with a constant memory overhead. To facilitate maintaining an HLL sketch in the presence of deletions, each bucket in an HLL sketch may hold an integer value less than a constant l where l is the number of bits of the hash value. By maintaining a max-heap of constant size (at most l), for each bucket, incremental deletion may be performed. To accommodate incremental deletion in embodiments in which multiple rows hash to a same value, a counter may be added to each entry of the heap to indicate the number.

Through experiments on databases and industry benchmark Transaction Processing Control (TPC) databases TPC-H and TPC-DS databases, it is shown that BML has lower overall error than using Bottom-k sketches in cases where at least one of the columns has relatively large cardinality. For cases where both columns have small cardinality, the accuracy of both estimators are similar. For example, in two databases in which there are many columns with small and large cardinality, the average error using Bottom-k sketches is about 0.30 and 0.59, respectively, whereas the corresponding errors for BML is about 0.10 and 0.14, respectively. For the other two databases analyzed, where most columns have small cardinality, the average error using Bottom-k sketches is about 0.05 and 0.02, respectively, whereas the corresponding errors for BML are 0.06 and 0.04, respectively.

Consider an application of inclusion coefficients, namely the problem of foreign-key (FK) detection in a database. Prior work on FK detection relies on exact inclusion coefficients to prune the FK candidates. This disclosure shows empirically, and on several databases, that the estimation error of BML is acceptable for these FK detection techniques. In other words, replacing the exact inclusion coefficient with an estimate obtained via the BML estimator has no noticeable impact on the precision and recall of these FK detection techniques.

In summary, this disclosure makes at least the following contributions: (1) establish a hardness result for inclusion coefficient estimation using bounded-memory sketches; (2) develop an MLE-based estimation technique, BML, for inclusion coefficient estimation based on HLL sketches; (3) show how, with a constant memory overhead, HLL sketches may be extended to support incremental deletion; (4) evaluate the effectiveness of BML using several synthetic and real-world datasets: (5) measure the precision and recall of two existing FK detection techniques when using inclusion coefficient estimates rather than the exact inclusion coefficients.

The rest of the disclosure is organized as follows: (1) present a hardness result for inclusion coefficient estimation using sketches; (2) introduce background of HLL sketch construction; (3) describe the BML estimator for inclusion coefficient and its error analysis; (4) extension to support incremental deletion is presented; and (5) describe the results of an experimental evaluation of inclusion coefficient estimation.

Problem Definition and Background

Let database, D, include the collection of tables, T, where C is the set of all columns in tables T. Let n be the total number of columns ($|C|=n$). For each column $X \in C$, the set of all possible values for X is called the domain of X, denoted by dom(X). X[i] is the value of column X for tuple i.

Inclusion Coefficient Estimation and Hardness Result

An inclusion coefficient, $\varphi$, may be used to measure a fraction of values of one set that are contained in another set. Given two columns/sets, X and Y, the inclusion coefficient of X and Y is defined as Equation 1.

$$\Phi(X, Y) = \frac{|X \cap Y|}{|X|}, |X| \neq 0 \quad \text{Equation 1}$$

In Equation 1, $|\cdot|$ represents the number of distinct values in a set. If X is fully covered by Y, such that ($X \subseteq Y$), $\Phi(X, Y)=1$; otherwise $0 \leq \Phi(X, Y)<1$. Note that $\Phi(X, Y)$ is generally asymmetric (in general, $\Phi(X, Y)$ is not equal to $\Phi(Y, X)$).

In tasks, such as FK detection and data profiling, inclusion coefficients are calculated for many pairs of columns, which may be too expensive (in terms of both time or memory) for large datasets. As a trade-off between accuracy and performance, a sketch (a compact data structure) may be constructed for each column $C \in C$ by scanning the data once, and estimating the inclusion coefficient between any pair of columns using their sketches.

Such sketching and estimation techniques are useful in at least two scenarios: i) columns are too large to fit into memory; and ii) computing inclusion coefficients for many pairs of columns (e.g., there are n columns and inclusion coefficients that need to be calculated for all the $$\frac{n(n-1)}{2}$$

pairs).

Estimating Inclusion Coefficient Using Sketches

For each column $C \in C$, a sketch, $S_C$, may be constructed by scanning C once. Then for any two columns X and Y, an estimator $\hat{\Phi}(S_X, S_Y)$ to $\Phi(Y, X)$, may be derived by accessing only the two sketches. In the remainder, $\hat{\Phi}(S_X, S_Y)$ is represented by $\hat{\Phi}$ if X and Y are clear from the context. Table 1 shows other frequently used notations.

Estimation Error and Sketch Size

Consider an estimate of the inclusion coefficient $\Phi(Y, X)$ of two columns X and Y as $\hat{\Phi}$, using their sketches. The estimation error $|\Phi(Y, X)-\hat{\Phi}|$ ranges from 0 to 1. Considering the randomness in the sketch construction, ideally, the estimation error may be bounded with high probability, such that $|\Phi(Y, X)-\hat{\Phi}| \leq \varepsilon$ with probability of at least $1-\delta$ for any given two columns X and Y. Unfortunately, it may be shown that, unless the sketch size is linear in the number of distinct values (which may be equal to the number of rows), there is no sketch based on which the worst-case estimation error may be bounded with $\varepsilon<1$ and $\delta<1$.

A Lower Bound of Sketch Size

The hardness may be observed even in a very simple case when $X=\{x\}$ contains only one element, and Y is large. In this case, $\Phi(Y, X)$ takes value either 0 (if $x \notin Y$) or 1 (otherwise). Therefore, to bound the estimation error below any constant less than 1, from the sketches of Y, two cases may be distinguished: i) $x \notin Y$ or ii) $x \in Y$, with high probability—this is exactly the approximate membership problem. More formally, the hardness result may be proved.

A sketch may be pre-computed for each column in a database to estimate the inclusion coefficient for pairs of columns. If it is required that, for any two given columns $X \in C$ and $Y \in C$, $|\Phi(Y, X)-\hat{\Phi}| \leq \varepsilon < 1$ with probability at least $1-\delta > 0$, then any sketch uses space at least $\Omega$ ($n_C$ log $$\left(\frac{1}{\delta}\right))$$

bits per column $C \in C$, where $n_C$ is the number of distinct values in C.

Suppose it is desired to estimate the inclusion coefficient $\Phi(X, Y)$ using sketches of X and Y. Consider the case when $X=\{x\}$. Indeed, $\Phi(X, Y)=1$ if $x \in Y$, or 0 if $x \notin Y$. Therefore, to ensure that the estimation error is less than 1, there must be no false positive to the membership query $x \in Y$ (with probability less than $\delta$)—others have shown that, for this purpose, any sketch must use space at least $\Omega$(n log $$\left(\frac{1}{\delta}\right))$$

bits. Others have shown an even tighter lower bound of sketch sizes when the number of distinct values in each column is unknown.

HLL Sketch Construction

The worst-case error cannot be bounded based on sub-linear-size sketches. However, for particular instances of X and Y, the estimation errors may still be better than the worst-case error. HLL sketch provides a near-optimal way to estimate cardinality (the number of distinct values in a set). Below, it will be shown how to use HLL sketches to estimate inclusion coefficients. We first review how to construct the HLL sketch of a column.

HLL Summary

FIG. 1 illustrates, by way of example, an embodiment of a diagram of method 100 for HLL. The method 100 as illustrated includes one or more tables of data 102. As illustrated, the table of data 102 includes a column of N rows. Each of the N rows of column X some number of bits of data, different rows can have different amounts of data. The size of the data is not limiting and may be any size acceptable to a memory, usually a power of two (e.g., 2, 4, 8, 16, 32, 64, 128, or 256 bits, etc.).

In the method 100, the data in rows I and j of the table of data 102 are hashed at operation 103 to a hash value. The number of bits produced by the hash function is not limiting and may be any number of bits. In the method 100, each hashed value is split into two segments, a first segment 104 that determines a bucket number 106 and a second segment 108 that is to be used to determine a value based on a position of a leading "1" 107. The value may be stored in a bucket 112A, 112B, or 112C corresponding to the bucket number 106 if it is greater than the current value in the bucket 112A-112C. The operation 109 indicates this operation as determining a maximum of a leading "1".

All buckets 112A-112C and their corresponding values form a sketch 110 for the column, in the example, column X. For example, let a hash value of the data be "01000110". Assume that the first segment 104 is "01" and corresponds to bucket 112B. The second segment 108, which, in this example is "000110", may be used as input to determine a value. The value can be determined by identifying a position of the first one (from the most significant bit or least significant bit position of the second segment 108, assume for this example that it is the former). Using this operation, the position of the leading "1" is in the fourth position for the value "000110". The value of four may be recorded in the bucket 112B, if four is greater than the value currently recorded in the bucket 112B. Else, the four may be ignored and the next data may be processed, until the whole column has been processed in this manner. This forms the sketch 110 of the column.

The sketches of two columns may be used to determine an inclusion coefficient for the two columns. Discussed herein are embodiments of how to use the sketches to determine the inclusion coefficient, how to allow for incremental deletion without a significant amount of data overhead, among other details.

More formally, let h: dom(X)→{0,1}$^l$ be a hash function that returns l bits for each value X[i]∈dom(X). For each hash value $s_i$=h(X[i]), find the position of the leftmost 1 represented by $\rho(s_i)$ and the maximum of {$\rho(s_i)$: $s_i$=h(X[i])} is the HLL sketch of the column X which is used for cardinality estimation.

One way to reduce the variance of the estimation is to use multiple hash functions; however, others have proposed stochastic averaging that employs only a single hash function to emulate the effect of using different hash functions. Others have used the hash function, but take the first segment of bits to bucketize hash values to mimic $2^m$ hash functions and reduce the variance. Then the remaining l−m bits of each hash value $s_i$=h(X[i]) (the second segment) may be used to find the position of the leftmost 1 as $\rho(s_i)$. How to choose the parameter m for given two columns X and Y is discussed elsewhere herein.

For example, one hash function h is used for all values in column X and the first m bits (the first segment) are used to bucketize hash values. As a result, there are $2^m$ buckets ($b_1$, $b_2$, ..., $b_{2^m}$) in HLL sketch of column X represented by $S_X$. Specifically, $s_i$=h(X[i]) and $s_j$=h(X[j]) are assigned to bucket $b_1$ because the first m bits are the binary representation of the value one. Assume that $\rho(s_i)$=3 and $\rho(s_j)$=4 because the position of the leftmost 1 in the remaining l−m bits of the hash values $s_i$ and $s_j$ are 3, and 4 respectively. If the $s_i$ and $s_j$ are the only hash values assigned to $b_1$, the final value in $b_1$ is $V_1^X$=max(3, 4)=4. A formal definition of $V_1^X$ is given: $V_1^X$ is an HLL value of column X in bucket $b_1$. Let $s_j$ be the hash value of the tuple j in X whose first m bits ($s_j$[1, ..., m]) indicate it belongs to bucket $b_i$ ($s_j$[1, ..., m] is the binary representation of the value i (($s_j$[1, ..., m])$_2$=i), and $\rho(s_j)$ be the leftmost one in the remaining 1 ... m bits of the hash value $s_j$ ($s_j$[m+1, ..., l]). The HLL value of column X for the bucket $b_i$ is defined as Equation 2

$$V_i^X = \max_{s_j:(s_j[1,...,m])_2=i} \rho(s_j) \qquad \text{Equation 2}$$

Note that when there is only one bucket the index i is ignored, and the HLL value of column X is denoted by $V^X$.

Space Complexity

In the HLL sketch of the column X($S_X$) the HLL value of each bucket is an integer number (1≤$V_i^X$≤l−m). Thus, each bucket needs log(l−m) bits to store $V_i^X$ (total memory to store the sketch $S_X$ is O($2^m$ log(l−m))).

Estimation of Inclusion Coefficient

A technique to estimate the inclusion coefficient using HLL sketches is provided. An HLL sketch may be constructed for all columns by scanning the data only once (in practice these sketches are compact enough to be able to fit into memory). The method described aims to estimate the inclusion coefficient of two columns X and Y using pre-computed HLL sketches of X and Y. An error bound for the estimate is provided.

Overview

A goal may be to produce an estimate of the inclusion coefficient between two columns X and Y by comparing their HLL values. To develop intuition on why comparing the HLL values of X and Y may help in finding the inclusion coefficient, consider the case of an HLL sketch with a single bucket, and consider that X and Y have a same number of distinct values. The following two extreme cases are examined: i) if X=Y or Φ(X, Y)=1, then pr($V^X$≤$V^Y$)= pr($V^Y$≤$V^X$)=1, because the hash function h in HLL is applied on the same set of values for both X and Y; and ii) if X∩Y=∅ or Φ(X, Y)=0, pr($V^X$≤$V^Y$) is at least 0.5. Note that pr($V^X$≤$V^Y$) increases monotonically as Φ(X, Y) increases. For example, FIG. 2 includes a plot of pr($V^X$≤$V^Y$) as a function of Φ(X, Y) when |X|=|Y|=$10^4$. A derivation of this function for general cases is provided below.

Given bucket i, for each of columns X and Y, the event $V_i^X$<=$V_i^Y$ is a Bernoulli trial. When there are multiple buckets, since buckets are independent, the events $V_i^X$<=$V_i^Y$ are independent Bernoulli trials. The reason that, for a given column the buckets are independent, is a result of the HLL construction. From a property of the universal hashing, the first m bits of a hash value are independent of the remaining l−m bits.

Figure 2:
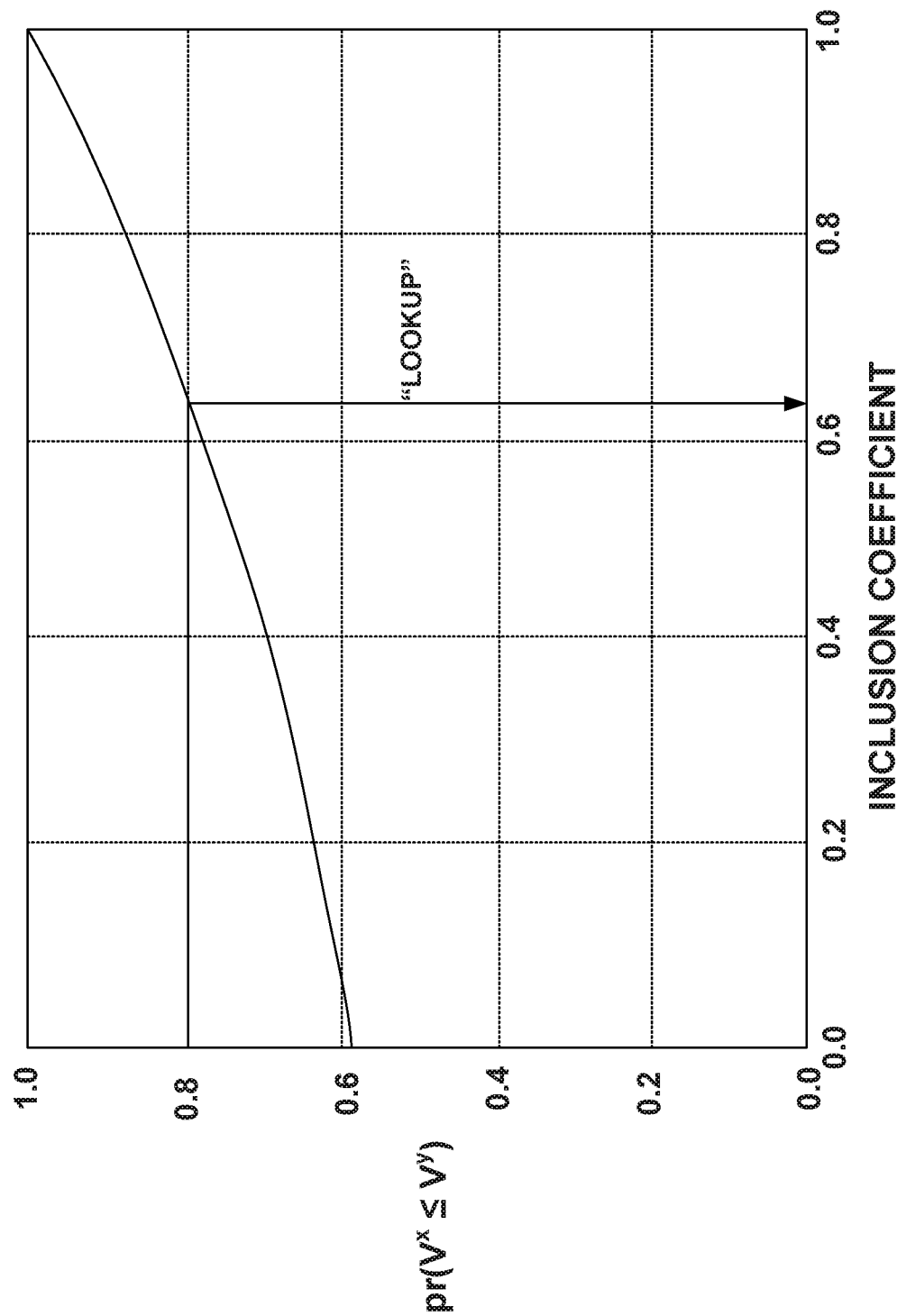
FIG. 2 illustrates, by way of example, a plot of a probability that a hash value in a bucket of a sketch of a first column of data is less than or equal to a hash value in a corresponding bucket of a sketch of a second column of data as a function of an inclusion coefficient.

An intuition behind an inclusion coefficient technique is that, using multiple buckets in the HLL sketches of X and Y, $pr(V^X \leq V^Y)$ may be estimated given the fact that the event $V^X \leq V^Y$ is an independent Bernoulli trial for each bucket $b_i$ (e.g., estimating $pr(V^X \leq V^Y) \approx 0.8$ in FIG. 2). Then, since $pr(V^X \leq V^Y)$ may be written as a function of the inclusion coefficient, the value of $\Phi(X, Y)$ that produces the estimated $pr(V^X \leq V^Y)$ may be looked up. For example, in FIG. 2, by looking up, $\Phi(X, Y) \approx 0.62$.

Maximizing the Likelihood

Embodiments may be based on the maximum likelihood estimation (MLE). More formally, let $Z = |\{i | V_i^X \leq V_i^Y\}|$ be the number of buckets (among all $2^m$ buckets) where $V_i^X \leq V_i^Y$. The random variable Z follows a distribution parameterized by |X|, |Y|, and $\Phi(X, Y)$. Observe Z=z from HLL sketches of X and Y, and choose $\Phi(X, Y)$ to maximize the likelihood of the observation as in Equation 3.

$$\Phi_{mle} = \text{argmax}_\Phi pr(Z=z|P(X,Y) = \emptyset) \quad \text{Equation 3}$$

Binomial mean lookup (BML) is introduced which is based on the MLE estimation. Suppose |X| and |Y| are known (or estimated from their HLL sketches), there are at least two remaining issues. First, the distribution of Z may be characterized with $\Phi(X, Y)$ as a parameter. Second, an efficient technique to maximize the likelihood as in Equation 3.

BML: Binomial Mean Lookup Estimator

As shown in FIG. 2, $pr(V^X \leq V^Y)$ increases monotonically as $\Phi(X, Y)$ increases. An explanation of how to derive the closed form of $pr(V^X \leq V^Y)$ as a function of $\Phi(X, Y)$ is provided along with more details of an inclusion coefficient estimator BML.

Determining $pr(V^X \leq V^Y)$

Given columns X and Y, $V^X$ and $V^Y$ are both random variables. First, consider a simpler case where there is only one random variable $V^X$ and how to find $pr(V^X \geq k)$, where k is constant. Then consider how to use this simpler case to derive the general case $pr(V^X \leq V^Y)$.

Given column X with $n_X$ distinct values, when there is only one bucket (m=0), the HLL value of the column X is the maximum over $n_X$ independent random variables. As previously discussed, for each hash value $s_i$, the position of the leftmost 1 (from the most significant bit to the least significant bit) represented by $\rho(s_i)$ and the maximum of $\{\rho(s_i): s_i = h(X[i])\}$ is the HLL sketch of the column X. Every bit of $s_i$ is a Bernoulli trial given that it is a random experiment with exactly two possible outcomes, "0" and "1". From a property of universal hashing every bit of a hash value is independent from each other. Thus, the bits in $s_i$ are independent Bernoulli trials. Each random variable $\rho(s_i)$ represents the leftmost "1" in $s_i$ (e.g., first one after $\rho(s_i)$−1 zeros). Thus, each random variable is geometrically distributed and $pr(V_X \leq k)$ may be expressed as Equation 4:

$$pr(V^X \leq k) = \prod_{i=1}^{n_X} (1 - \Pr(\text{first } k \text{ bits are zero})) = \left(1 - \frac{1}{2^k}\right)^{n_X} \quad \text{Equation 4}$$

By Equation 4, $pr(V^X = k)$ is $pr(V^X \leq k) - pr(V^X \leq k-1)$ and $pr(V^X = k) =$ $$\left(1 - \frac{1}{2^k}\right)^{n_X} - \left(1 - \frac{1}{2^{k-1}}\right)^{n_X} \quad \text{Equation 5}$$

Equations 4 and 5 may be used to derive $pr(V^X \leq V^Y)$, where both $V^X$ and $V^Y$ are random variables. When the intersection of X and Y is non-empty $V^X$ and $V^Y$ are not independent. Let T be X∩Y. To resolve the dependency of X and Y, consider three disjoint sets: T, x=X\T, and y=Y\T. As shown in Table 1, based on the cardinality of these sets there are three different cases. (1) X and Y are disjoint ($n_T=0$, $n_x=n_X$, $n_y=n_Y$); (2) Y is subset of X (y=Y\T is empty ($n_T=n_Y$, $n_x=n_X-n_Y$, $n_y=0$)); (3) X and Y partially overlap y=Y\T is not empty ($n_T \neq 0$, nx≠0, $n_y \neq 0$). Next, it is shown how to use Equations 4, and 5 to derive the $pr(V^X \leq V^Y)$ for each case.

Case1: If T=X∩Y is empty ($n_T=0$), then $V^X$ and $V^Y$ are independent. As shown in Table 1, since it is desired to determine whether $V^X \leq V^Y$, if X and Y are disjoint and $V^y=k$, then $V^X$ is at most k and $0 \leq k \leq l-m$. Thus $pr(V^X \leq V^Y)$ with the help of Equations 4 and 5 may be calculated by Equation 6. Note that $n_T=0$, $n_x=n_X$, and $n_y=n_Y$.

$$pr(V^X \leq V^Y) = \sum_{k=0}^{\ell-m} pr(V^X \leq k) \wedge pr(V^y = k) = \quad \text{Equation 6}$$

$$\sum_{k=0}^{\ell-m} \left(1 - \frac{1}{2^k}\right)^{n_x} \left(\left(1 - \frac{1}{2^k}\right)^{n_y} - \left(1 - \frac{1}{2^{k-1}}\right)^{n_y}\right)$$

For example, by Equation 6, when $|X|=|Y|=10^4$, $n_T=0$, $\Phi(X, Y)$ is 0 the $pr(V^X \leq V^Y) \approx 0.58$ (see FIG. 2).

Case2: If $Y \subset X$, then T=Y and y is empty ($n_y=0$). Similar to case 1, if $V^T=k$, then $V^X$ should be at most k, where k may be any value in [0, l−m]. So $pr(V^X \leq V^Y)$ may be expressed as Equation 7:

$$pr(V^X \leq V^Y) = \sum_{k=0}^{\ell-m} pr(V^X \leq k) \wedge pr(V^T = k) = \quad \text{Equation 7}$$

$$\sum_{k=0}^{\ell-m} \left(1 - \frac{1}{2^k}\right)^{n_x} \left(\left(1 - \frac{1}{2^k}\right)^{n_T} - \left(1 - \frac{1}{2^{k-1}}\right)^{n_T}\right)$$

For example, when $|X|=|Y|=10^4$, and $n_T=10^4$ the $\Phi(X\ Y)$ is 1 and the $pr(V^X \leq V^Y) \approx 1$ (see FIG. 2).

Case3: Finally, if X and Y partially overlap, as shown in Table 1, given k there are three scenarios: (1) $V^X \leq k$, $V^T \leq k-1$, $V^y=k$, (2) $V^X \leq k$, $V^T=k$, $V^y \leq k-1$, and (3) $V^X \leq k$, $V^T=k$, $V^y=k-1$. Thus, the $pr(V^X \leq V^Y)$ may be expressed by Equation 8.

$$pr(V^X \leq V^Y) = \quad \text{Equation 8}$$

$$\sum_{k=0}^{\ell-m} pr(V^X \leq k) \wedge pr(V^T \leq k-1) \wedge pr(V^y = k) +$$

$$pr(V^X \leq k) \wedge pr(V^T = k) \wedge pr(V^y \leq k-1) +$$

$$pr(V^X \leq k) \wedge pr(V^T = k) \wedge pr(V^y = k) =$$

$$\sum_{k=0}^{\ell-m} \left(1 - \frac{1}{2^k}\right)^{n_x} \left(1 - \frac{1}{2^{k-1}}\right)^{n_T} \left(\left(1 - \frac{1}{2^k}\right)^{n_y} - \left(1 - \frac{1}{2^{k-1}}\right)^{n_y}\right) +$$

$$\left(1 - \frac{1}{2^k}\right)^{n_x} \left(\left(1 - \frac{1}{2^k}\right)^{n_T} - \left(1 - \frac{1}{2^{k-1}}\right)^{n_T}\right) \left(1 - \frac{1}{2^{k-1}}\right)^{n_y} +$$

-continued
$$\left(1-\frac{1}{2^k}\right)^{n_x}\left(\left(1-\frac{1}{2^k}\right)^{n_T}-\left(1-\frac{1}{2^{k-1}}\right)^{n_T}\right)$$
$$\left(\left(1-\frac{1}{2^k}\right)^{n_y}-\left(1-\frac{1}{2^{k-1}}\right)^{n_y}\right)$$

For example, when $|X|=|Y|=10^4$, and $n_T=6200$, $\Phi(X, Y)$ is 0.62 and the $pr(V^X \leq V^Y) \approx 0.8$ (see FIG. 2).

TABLE 1

Possible Relations Between X and Y

|  | $V^x$ | $V^T$ | $V^y$ |
| --- | --- | --- | --- |
| No overlap | ≤k | Empty | =k |
| Complete overlap | ≤k | =k | Empty |
| Partial overlap | ≤k | ≤k − 1 | =k |
| Partial overlap | ≤k | =k | ≤k − 1 |
| Partial overlap | ≤k | =k | =k |

Multiple Buckets:

When there are $2^m$ buckets (m>0), inspired by stochastic averaging, consider an average case where the HLL value of column X will be the maximum over, on average, $$\frac{n_X}{2^m}$$

independent random variables for each bucket i. With these constraints, Equations 4 and 5 may be updated as Equations 9 and 10, respectively:

$$pr(V_i^X \leq k) = \left(1-\frac{1}{2^k}\right)^{\frac{n_X}{2^m}} \quad \text{Equation 9}$$

$$pr(V_i^X \leq k) = \left(1-\frac{1}{2^k}\right)^{\frac{n_X}{2^m}} - \left(1-\frac{1}{2^{k-1}}\right)^{\frac{n_X}{2^m}} \quad \text{Equation 10}$$

A discussion of how considering the average case may affect how to choose the number of buckets is provided elsewhere herein.

Method to Maximize the Likelihood

Recall from Equation 3 that the problem of estimating inclusion coefficient may be formulated as a maximum likelihood estimation problem, where the number of buckets (among all $2^m$ buckets). $V_i^X \leq V_i^Y$ is z, and the goal is to choose $\Phi(X, Y)$ to maximize the likelihood of the observation. An estimator, BML, to efficiently solve the MLE is discussed. BML has at least two steps. Step one may include estimating $pr(V^X \leq V^Y)$ using only $S_X$ and $S_Y$. Step two is to use a lookup approach to map the estimated probability to the inclusion coefficient.

Before describing the details of these two steps, an overview of how BML operates is provided. As shown in FIG. 2, $pr(V^X \leq V^Y)$ increases by increasing the $\Phi(X, Y)$. If BML estimates $pr(V^X \leq V^Y)$, then BML may be used to find the $\Phi(X, Y)$. For example, assume the estimated value of $pr(V^X \leq V^Y)$ is 0.8 ($\hat{P}=0.8$). As shown in FIG. 2, after projection to the line, BML estimates $\Phi(X, Y)$ to be ≈0.62. The input to a BML technique may include the HLL sketches of column X and Y ($S_X$, $S_Y$). A discussion of how to choose a number of buckets for these sketches is provided below.

In the first step, to calculate $\hat{P}$, since the event $V_i^X \leq V_i^Y$ in each bucket $b_i$ is an independent Bernoulli trial, $\hat{P}$ is the ratio of the number of buckets where $V_i^X \leq V_i^Y$ to the total number of buckets ($2^m$). Later, the Hoeffding inequality is used to provide the error bound of $\hat{P}$. The following pseudocode is a summary of the method 300 of FIG. 3.

| BML// inclusion coefficient estimator |
| --- |
| Input: $S_X$, $S_Y$ <br> //Estimate $pr(V^X \leq V^Y)$ using $S_X$, $S_Y$ <br> z = 0 <br> for $b_i$, where i ∈ [1, $2^m$] <br>   if $V_i^X \leq V_i^Y$ then z = z + 1 <br><br> $\hat{P} = \frac{z}{2^m}$ <br><br> //Step 2: Lookup step <br> $n_X$ = Estimated number of distinct values from $S_X$ <br> $n_Y$ = Estimated number of distinct values from $S_Y$ <br> return $\hat{\Phi}(X, Y) = \text{Lookup}(\hat{P}, 0, \min(n_X, n_Y), n_X, n_Y)$ |

Figure 3:
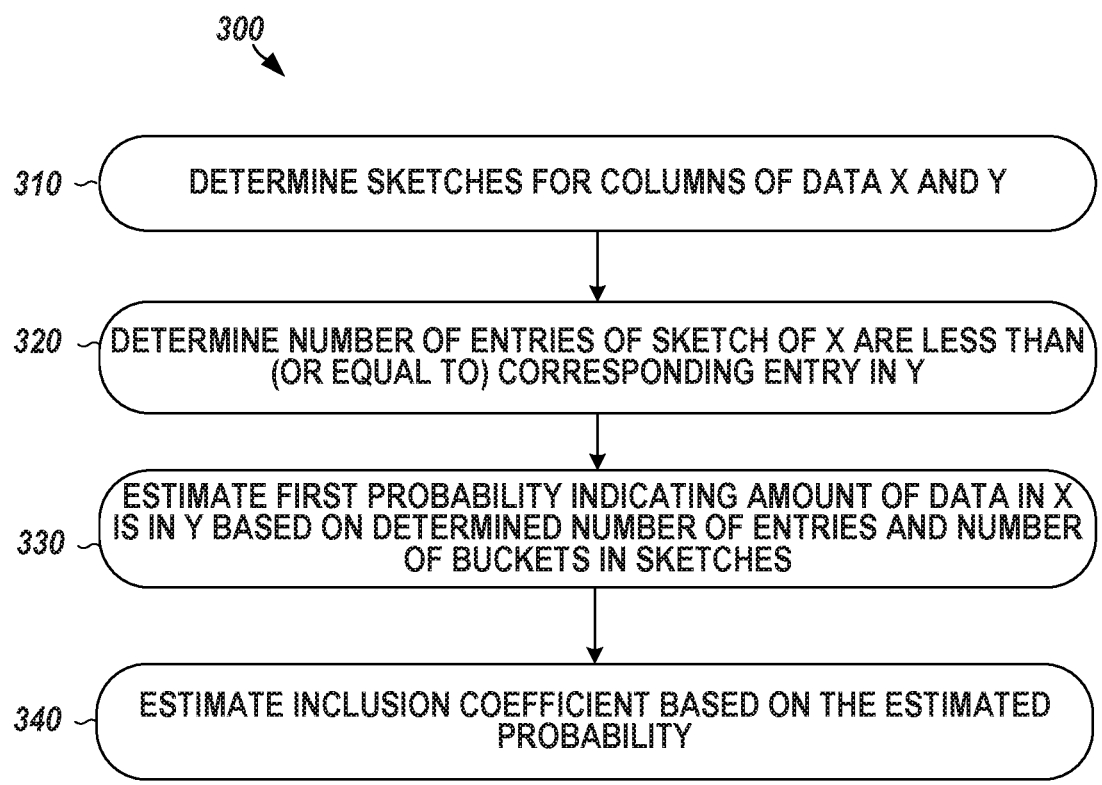
FIG. 3 illustrates, by way of example, a flowchart of an embodiment of a method for estimating an inclusion coefficient based on a sketch of data.

FIG. 3 illustrates, by way of example, a flowchart of an embodiment of a method 300 for estimating an inclusion coefficient based on a sketch of data. The method 300 as illustrated includes determining sketches for columns of data X and Y, at operation 310; determining a number of entries in sketch of X that are less than (or equal to) corresponding entry in the sketch of Y, at operation 320: estimating a probability that a value of sketch of X in a bucket of the sketch of X is less than, or equal to, a value of sketch of Y in a corresponding bucket of the sketch of Y, at operation 330; and estimating an inclusion coefficient based on the estimated probability, at operation 340. Operation 310 may include determining an HLL sketch of the columns of data X and Y. Operation 310 may be performed for multiple sketches with different numbers of buckets. The method 300 may further include determining which of the multiple sketches of X and Y to use in performing operation 320. Operation 310 is optional if one or more sketches of X and Y with the same number of buckets are available.

Figure 4:
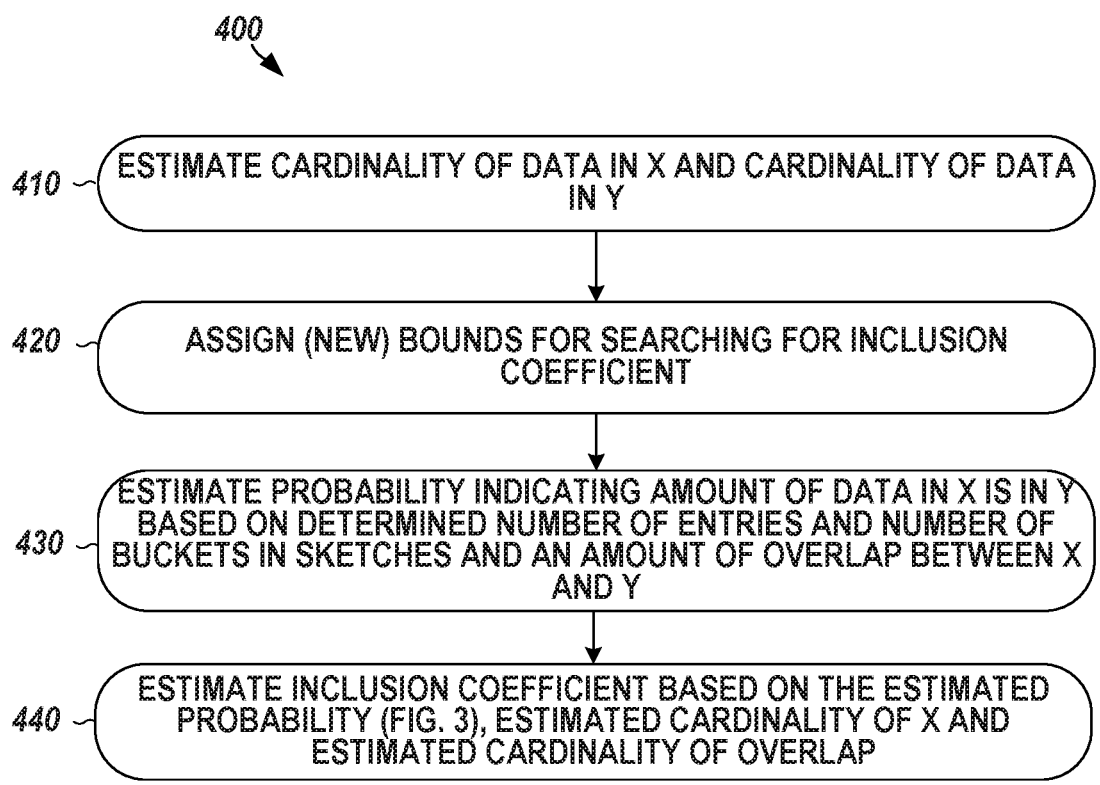
FIG. 4 illustrates, by way of example, a flowchart of an embodiment of a method for performing an operation of FIG. 3.

Operation 320 may include counting, bucket-by-bucket, the number of buckets in the sketch of X with a value less than (or equal to) a corresponding bucket in the sketch of Y. Operation 330 may include dividing the determined number at operation 320 by the total number of buckets. FIG. 4 illustrates more details regarding an embodiment of the operation 340.

BML may use a Lookup function (see pseudocode below and FIG. 4) to estimate the inclusion coefficient $\Phi(X, Y)$ as the one that produces the probability, $\hat{P}$, estimated at operation 330. Since $pr(V^X \leq V^Y)$ is an increasing function of $\Phi(X, Y)$, given an estimated probability $\hat{P}$, binary search may be used to estimate $\Phi(X, Y)$. Lookup (below) shows the pseudocode of an embodiment of a lookup approach. The inputs include $\hat{P}$, minInc, maxInc, $n_X$, $n_Y$, and ε where $\hat{P}$ is the estimation of the $pr(V^X \leq C^Y)$, minInc and maxInc are the boundary of the search, $n_X$, $n_Y$ are the estimated cardinality of the X and Y, and ε is the error or tolerance. Lookup performs a binary search over the possible intersection size $n_T$ and at each iteration based on the value of $n_T$ depends on which case it is, it uses the suitable Equation. For example, if X∩Y=∅ Lookup may use Equation 6. Lookup provides a bisection procedure for iteratively converging on a solution which is known to lie inside some interval [a, b], such as for root finding. It has been shown that the number of iterations required to obtain an error smaller than ε is $$\frac{\ln(a-b) - \ln \varepsilon}{\ln 2}.$$

In embodiments, since $0 \leq \Phi(X, Y) \leq 1$, the number of iterations may be $$\frac{-\ln \varepsilon}{\ln 2}.$$

For example, Lookup only needs 17 iterations to obtain an error smaller than $\varepsilon = 10^{-5}$. The cost of each iteration is cheap (analysis below).

---
Lookup // Map $\hat{P}$ into $\hat{\Phi}(X, Y)$
---
Input: $\hat{P}$, minInc, maxInc, $n_X$, $n_Y$, $\varepsilon$
Outputs: $\hat{\Phi}(X, Y)$ $$n_T = \frac{minInc + maxInc}{2}; \hat{\Phi} = \frac{n_T}{n_X}$$

if ($n_T = n_X$ & $n_T = n_Y$) then Prob = 1.0 // X = Y
else if ($n_T = 0$) then Prob = Equation 6 // X ∩ Y = ∅
else if ($n_X > n_Y$ & $n_T = n_Y$) then Prob = Equation 7
else Prob = Equation 8
if |Prob − $\hat{P}$| ≤ $\varepsilon$ return $\hat{\Phi}$
if Prob > $\hat{P}$ return Lookup($\hat{P}$, $n_T$, maxInc, $n_X$, $n_Y$)
if Prob < $\hat{P}$ return Lookup($\hat{P}$, minInc, $n_T$, $n_X$, $n_Y$)

---

FIG. 4 illustrates, by way of example, a flowchart of an embodiment of a method 400 for performing the operation 340. The method 400 as illustrated includes estimating a cardinality of data in X and cardinality of data in Y, at operation 410: assigning (new) bounds for searching a function for the inclusion coefficient, at operation 420: estimating a probability indicating amount of data in X is in Y based on determined number of entries and number of buckets in sketches and an amount of overlap between X and Y, at operation 430: and estimating the inclusion coefficient based on the estimated probability (from operation 330), estimated cardinality of X. and estimated cardinality of overlap, at operation 440. The operation 410 may include determining a raw cardinality and adjusting the estimated cardinality based on a comparison of the raw cardinality to one or more constant values. The raw cardinality may be determined for each column of data. The raw cardinality may be determined based on the number of buckets, m, in the sketch, the number of empty buckets, V, and a constant that varies based on the number of buckets, $\alpha$. For example, the raw cardinality. E, may be determined as $E = \alpha_m m^2 (\Sigma_{j=1}^{m} 2^{-M[j]})^{-1}$. The operation 410 may include adjusting the raw cardinality based on a comparison of the raw cardinality to a threshold. For example, the following pseudocode defines some corrections to the raw cardinality based on the comparison.

---
Raw Cardinality Adjust
---
Input E, m
Output n
if E ≤ 5/2m then if V > 0 then n = mlog(m/V) else n = E;
if E ≤ 1/30*$2^{32}$ then n = E;
else n = −$2^{32}$log(1−E/$2^{32}$);
return n

---

Operation 430 may include an average of the bounds determined at operation 420. Operation 440 may include setting the inclusion coefficient to the cardinality of overlap divided by the cardinality of X if the probability determined at operation 430 is within an error bound of a probability defined by one of Equations 6-8. If the probability determined at operation 430 is not within the error bound, $\varepsilon$, of the probability of one of equations 6-8, the binary lookup bounds are updated and Lookup is iterated on the new bounds.

Correctness and Error Analysis of BML

The following analysis shows the correctness, efficiency, and the error bound of BML. It may be proven that $pr(V^X \leq V^Y)$ is an increasing function of $\Phi(X, Y)$, such that in a lookup step there is a one-to-one mapping between the probability $pr(V^X \leq V^Y)$ and the inclusion coefficient. In Equation 3, the problem of estimating the inclusion coefficient is posed as a maximum likelihood problem. The results of BML and the MLE formulation in Equation 3 may be shown to be identical. The error bound of the BML for estimation of the $pr(V^X \leq V^Y)$ and inclusion coefficient are provided. Finally, the time complexity of the BML is provided.

BML Correctness

BML may use binary search to find the mapping between the probability $\hat{P}$ and the inclusion coefficient (see Lookup technique or FIG. 4). This approach works if there is a one-to-one mapping from $pr(V^X \leq V^Y)$ into $\Phi(X, Y)$. Theorem 2 shows that probability $pr(V^X \leq V^Y)$ is an increasing function of $\Phi(X, Y)$. An increasing function is a one to one function, and is invertible.

As previously discussed, given two columns, X and Y, with intersection T, where $|T| = n_T$, probability $pr(V^X \leq V^Y)$ is an increasing function of $\Phi(X, Y)$. Further, the inclusion coefficient estimate $\hat{\Phi}$ from the BML technique (see FIG. 3) and the inclusion coefficient estimate $\Phi_{mle}$ from MLE formulation of Equation 3 are identical.

Error Bound of the Probability Estimation

Figure 5:
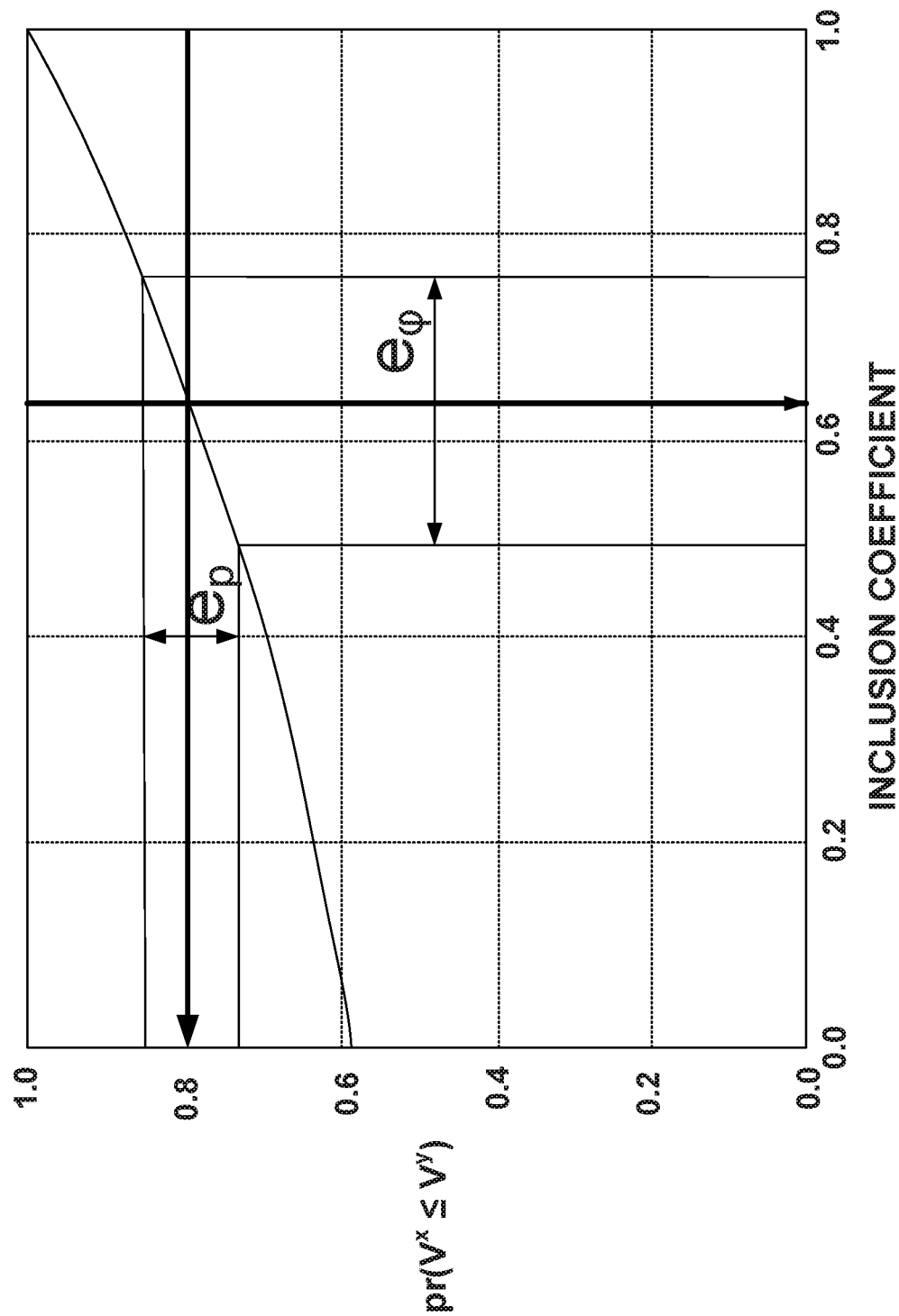
FIG. 5 illustrates, by way of example, a diagram of an embodiment of error in determining a probability that a hash value in a bucket of a sketch of a first column of data is less than or equal to a hash value in a corresponding bucket of a sketch of a second column of data and the effect on error of determining the inclusion coefficient.
Figure 6:
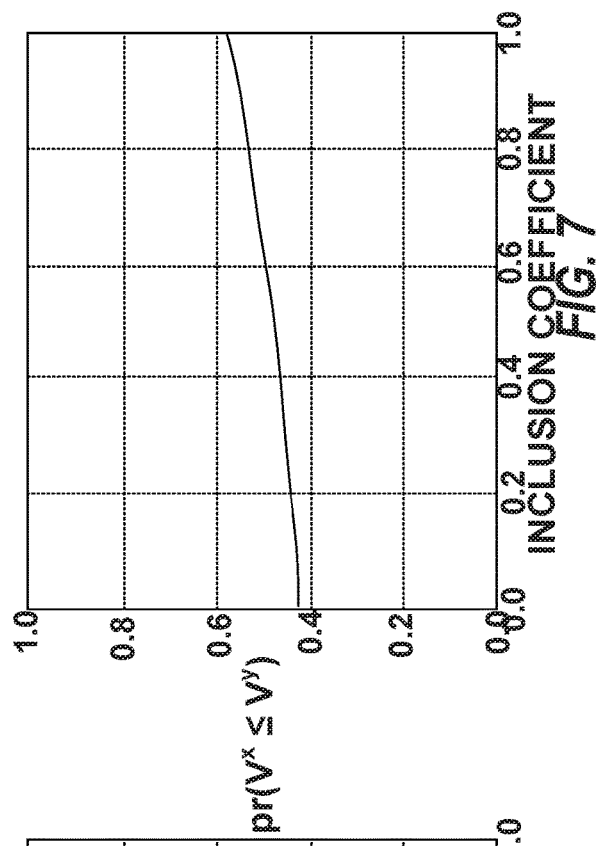
FIGS. 6-9 show examples of how the slope of P varies for columns with different cardinalities.
Figure 8:
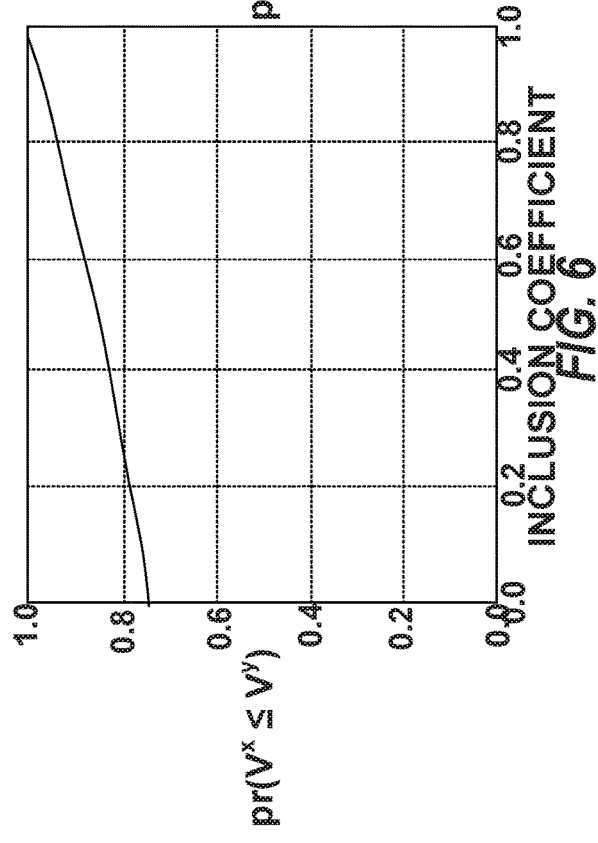
Figure 7:
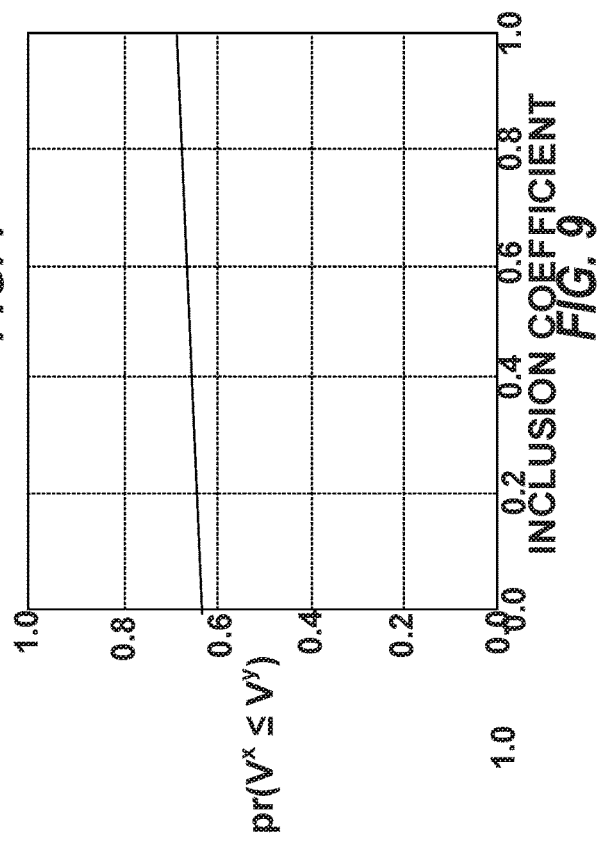

FIG. 5 illustrates, by way of example, a graph of an embodiment of error in determining $pr(V^X \leq V^Y)$ and the effect on error of determining the inclusion coefficient. Let P and $\hat{P}$ be the exact and estimated value of the $pr(V^X \leq V^Y)$, respectively. BML (see FIG. 3, for example) calculates $\hat{P}$ as the ratio of the number of buckets where $V_i^X \leq V_i^Y$ to the total number of buckets $2^m$. As shown in FIG. 5, this estimation may produce error $e_p$, (e.g., $\hat{P} = 0.8$ while $P = 0.8 \pm e_p$). FIG. 5 also shows that, when $\hat{P} = 0.8$, the lookup step in BML returns 0.62 as the estimated inclusion coefficient while the actual one is $0.62 \pm e_\Phi$ (FIG. 5). Thus, estimation error $e_p$ results in $e_\Phi$ (estimation error of the inclusion coefficient $\Phi(X, Y)$). Given an error $e_p$ ($0 \leq e_p \leq 1$), what is the probability that the estimation error of BML will be at most $e_p$? This question is answered and then it is shown how to use the $e_p$ to bound estimation error of the inclusion coefficient.

A probability that estimation error of $\hat{P}$ is at most $e_p$ is: $pr(|\hat{P}-P| \leq e_p) \geq 1 - 2\exp(-2^{m+1} e_p^2)$. For example, when m=7 and estimation error $e_p$ is 0.014, the $pr(|\hat{P}-P| \leq e_p)$ is at least 0.95. i.e., with 95% confidence the estimation error is at most 1.4%.

Error Bound of the Inclusion Coefficient Estimation

From FIG. 5 one may see that the slope of P (the line) at any point represents the ratio of $e_p$ to $e_\Phi$ (e.g., when $\hat{P} = 0.8$, the estimated inclusion coefficient is 0.62 and the slope of P at 0.62. P' (0.62), is $$\frac{e_p}{e_\Phi}).$$

One may numerically find this slope of P for a given a point α (e.g., P'(0.62)=0.7). Moreover, as discussed previously, with 95% confidence the estimation error $e_p$ is 0.014. Thus $e_\Phi$ at this point may be calculated as $$\frac{0.014}{0.7} = 0.02.$$

More formally at any point α:

$$e_\Phi = \frac{e_p}{P'(a)} \quad \text{Equation 11}$$

So far it has been shown how to find $e_\Phi$ for a given point. The slope of P in FIG. 5 at different points are different. Thus, to bound $e_\Phi$ of two columns X and Y, first find the minimum and maximum slopes of P, then the ratio of $e_p$ to those slopes will be the bound of $e_\Phi$. Table 2 shows the minimum and maximum slopes of the P and the $e_p$ bound for columns X and Y with different cardinalities. For example, when the cardinality of both X and Y is $10^4$, the minimum and maximum slopes of P, in FIG. 5 are about 0.241 and about 0.719, respectively, and the minimum and maximum $e_\Phi$ are $$\frac{0.014}{0.719} = 0.02 \text{ and } \frac{0.014}{0.241} = 0.05,$$

where the $e_p$ is 0.014. FIGS. 6-9 show examples of how the slope of P varies for columns with different cardinalities. The slope of P reduces as the difference of the cardinalities of the X and Y increases (e.g., when |X|=1000, |Y|=$10^4$ the minimum and maximum slopes of P are 0.062 and 0.072 respectively). When the slope of P reduces, $e_\Phi$ will increase. Table 2 provides bounds for errors in some example scenarios.

TABLE 2

Min and Max Error Bounds for Synthetic Data

| |X| | |Y| | min($e_p/e_\Phi$) | max($e_p/e_\Phi$) | min($e_\Phi$) | max($e_\Phi$) |
|---|---|---|---|---|---|
| 10000 | 10000 | 0.241 | 0.719 | 0.02 | 0.05 |
| 9000 | 10000 | 0.235 | 0.646 | 0.02 | 0.06 |
| 7000 | 10000 | 0.219 | 0.503 | 0.03 | 0.06 |
| 5000 | 10000 | 0.192 | 0.359 | 0.04 | 0.07 |
| 3000 | 10000 | 0.145 | 0.216 | 0.06 | 0.09 |
| 1000 | 10000 | 0.062 | 0.072 | 0.2 | 0.23 |

Time Complexity of BML

In BML, the estimation of $pr(V^X \leq V^Y)$ using $S_X$, $S_Y$ may take $2^m$ steps, where $2^m$ is the number of buckets. As discussed previously, the binary search in the lookup step takes $$\frac{-\ln \varepsilon}{\ln 2}$$

iterations to obtain an error smaller than ε. The cost of each iteration is in O(l−m) due, at least in part, to Equations 6, 7, and 8 used in the Lookup technique being the sum of l−m values. Thus, the time complexity of BML may be $$O\left(2^m + \frac{-\ln \varepsilon}{\ln 2}(\ell - m)\right)$$

which is linear in the number of buckets.

Choosing Number of Buckets

The following pseudocode shows an embodiment of a process to construct HLL sketches for a set of columns C. This technique reads data only once and for each column X∈C it generates the HLL sketch with $2^m$ buckets.

---
ConstructHLLSketch
---
Input: Columns: C, Number of buckets: $2^m$, Hash function: h
Output: $S_X = \{b_1: V_1^X, \ldots, b_{2^m}: V_{2^m}^X\}$
For column X ∈ C
  for value X[I] ∈ X
    $S_i$ = h(X[i])
    j = bucket index determined by the leftmost m bits of $s_i$
    $p(s_i)$ = position of the leftmost 1 in the l − m bits of $s_i$
    if $b_j$ in $S_X$ then $V_j^X$ = Max ($S_X[b_j], p(s_i)$) else $V_j^X = p(s_i)$
    $S_X$.Add($b_j, V_j^X$)
---

ConstructHLLSketch shows an embodiment of a technique to construct an HLL sketch for a fixed m. Given two columns X and Y what considerations may be considered in choosing parameter m (number of bits for the buckets). Then it is shown how this technique changes when all pairs of columns are considered, since parameter m may be varied.

Parameter m for a Given Column Pair

The HLL construction of column X may be viewed as a "bins and balls" problem, where buckets are the bins and distinct values in column X are balls. As discussed previously, given column X with $n_x$ distinct values, when there is only one bucket, the HLL value of column X is the maximum over $n_x$ independent random variables. When there are $2^m$ buckets (m>0), the HLL value of column X may be the maximum over, on average, $$\frac{n_x}{2^m}$$

independent random variables for each bucket (balanced load in each bucket). In a bins and balls problem, as the number of bins increases, the probability of a balanced load decreases. In other words, given $n_x$ balls and $2^m$ bins, the probability that all bins contain exactly $$\frac{n_x}{2^m}$$

balls decrease as the number of bins increases. Thus, in HLL construction of column X, it is expected that, as the number of buckets increases, the probability that all buckets have the same load decreases. However, having a large number of buckets reduces the variance of cardinality estimation using an HLL sketch.

Thus having a fewer number of buckets increases the probability of a balanced load $$\left(\frac{n_X}{2^m}\right),$$

but a greater number of buckets reduces the variance of estimation. For the perfect balanced load, there is one bucket, and for the lowest variance, there are $n_x$ ($m=\log(n_X)$) buckets. Given two columns X. and Y, in some embodiments and as a trade-off between the variance and the balanced load a mid-point between the best variance and the best-balanced load may be chosen, such as by considering the number of buckets as in Equation 12. The heuristic may not produce the optimal choice.

$$m = \frac{\log(\max(n_X, n_Y))}{2} \qquad \text{Equation 12}$$

Parameter m for Multiple Pairs of Columns

A goal may include efficiently estimating an inclusion coefficient for all column of pairs in a database. When multiple pairs of columns are considered, Equation 12 might return different m for a given column. For example, consider three columns X, Y, and Z with cardinality $n_X$, $n_Y$, and $n_Z$, respectively, where cardinality of X is smaller than Y and Z ($n_X<n_Y$, $n_X<n_Z$) and cardinality of Y and Z are not equal ($n_Y \neq n_Z$). In this example, for column pair X and Y, parameter m is $$\frac{\log(n_Y)}{2},$$

while for column pair X and Z parameter m is $$\frac{\log(n_Z)}{2}.$$

Thus, for column X the m has two values $$\frac{\log(n_Y)}{2} \text{ and } \frac{\log(n_Z)}{2}.$$

To address this problem, data may still be read only once, but sketches for different $m \in \{0, \ldots, 1\}$ may be kept. More specifically, after reading the data, embodiments may iterate over different values of m from 0 to 1. Even if all sketches are kept for all m from 0 to 1, the memory required only doubles because $\Sigma_{m=0}^{k} 2^m \log(l) = 2^{l+1} \log(l)$, where $2^m \log(l)$ is the size of sketch for each column. After constructing the sketches, given two columns X and Y, a decision is made regarding which m produces a better estimation of an inclusion coefficient (Equation 12) and those sketches are passed to the HLL construction technique.

What follows is a discussion of how to set the parameter l. Suppose the memory bound for each column is M. Given column X, bounded memory M, and l bits hash function h, the parameter l should be at most ln $$\left(\frac{M}{\log(\ell)}\right) - 1.$$

Leveraging More Memory

BML may leverage additional memory, when available, to improve its accuracy. It may be shown that increasing the number of buckets for HLL sketches reduces the variance of cardinality estimation. In other words, the bucketization (with stochastic averaging) emulates the effect of n hash functions with only one single hash function. However, as discussed previously, increasing the number of buckets reduces the probability of balanced load $$\left(\frac{n_X}{2^m}\right),$$

which may ultimately reduce the accuracy of BML. Thus, leveraging additional memory by increasing the number of buckets may not be adequate.

One solution to this problem is to combine the use of multiple hash functions and stochastic averaging to take advantage of additional memory. In other words, given two columns, X and Y, the number of buckets may be fixed to $2^m$, where m may be determined by Equation 12. Then multiple hash functions may be used in HLL construction. BML uses the sketches built by each hash function to estimate inclusion coefficient, and the final estimation of inclusion coefficient may be the average of those results.

Extension of HLL Construction to Support Deletion

HLL sketches are becoming increasingly popular for estimating cardinality in different applications, and are even being adopted in commercial database engines (e.g., HLL may be used to support approximate distinct count functionality). However, in data warehousing scenarios, it is not uncommon for recent data to be added and older data to be removed from the database. HLL sketches may be maintained incrementally in the presence of insertions. When a new data item X[k] is inserted to column X, the same HLL construction technique may determine the hash value of the X[k] ($s_k=h(X[k])$) and the affected bucket $b_j$ may be identified by the leftmost m bits of $s_k$. The technique may then find $\rho(s_k)$, which is the position of the leftmost 1 in the l–m bits of $s_k$. The technique may update the value of bucket j as $V_j^X = \max(S_X[b_j], \rho(s_k))$.

For example, consider the HLL sketch of the column X ($S_X$). Assume a new value X[k] is added to column X such that the first m bits of the $s_k=h(X[k])$ represents the first bucket ($b_1$) in $S_X$ and $\rho(s_k)$ is 5. Thus, the value of the $b_1$ may be updated to max (4, 5)=5. On the other hand, when X[i] is deleted, similar to insertion, the affected bucket may be found. Let $b_j$ be the affected bucket. Since X[i] exists in database, $\rho(s_i) \leq S_X[b_j]$. If $\rho(s_i)<S_X[b_j]$, no update is required but if $\rho(s_i)=S_X[b_j]$, it means $\rho(s_i)$ is the largest and maybe should be deleted in the sketch. Since it is not known what the second largest value is for that bucket, the deletion cannot be handled efficiently.

Figure 9:
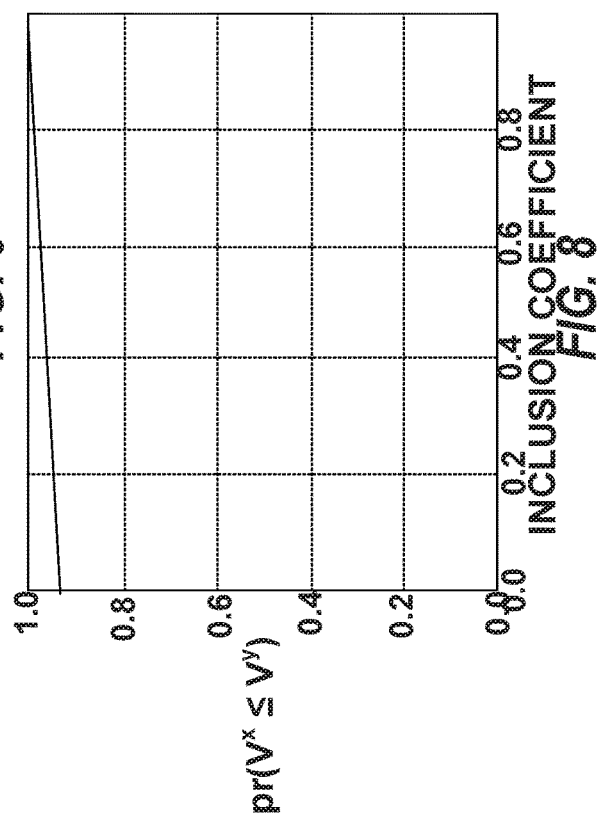
Figure 10:
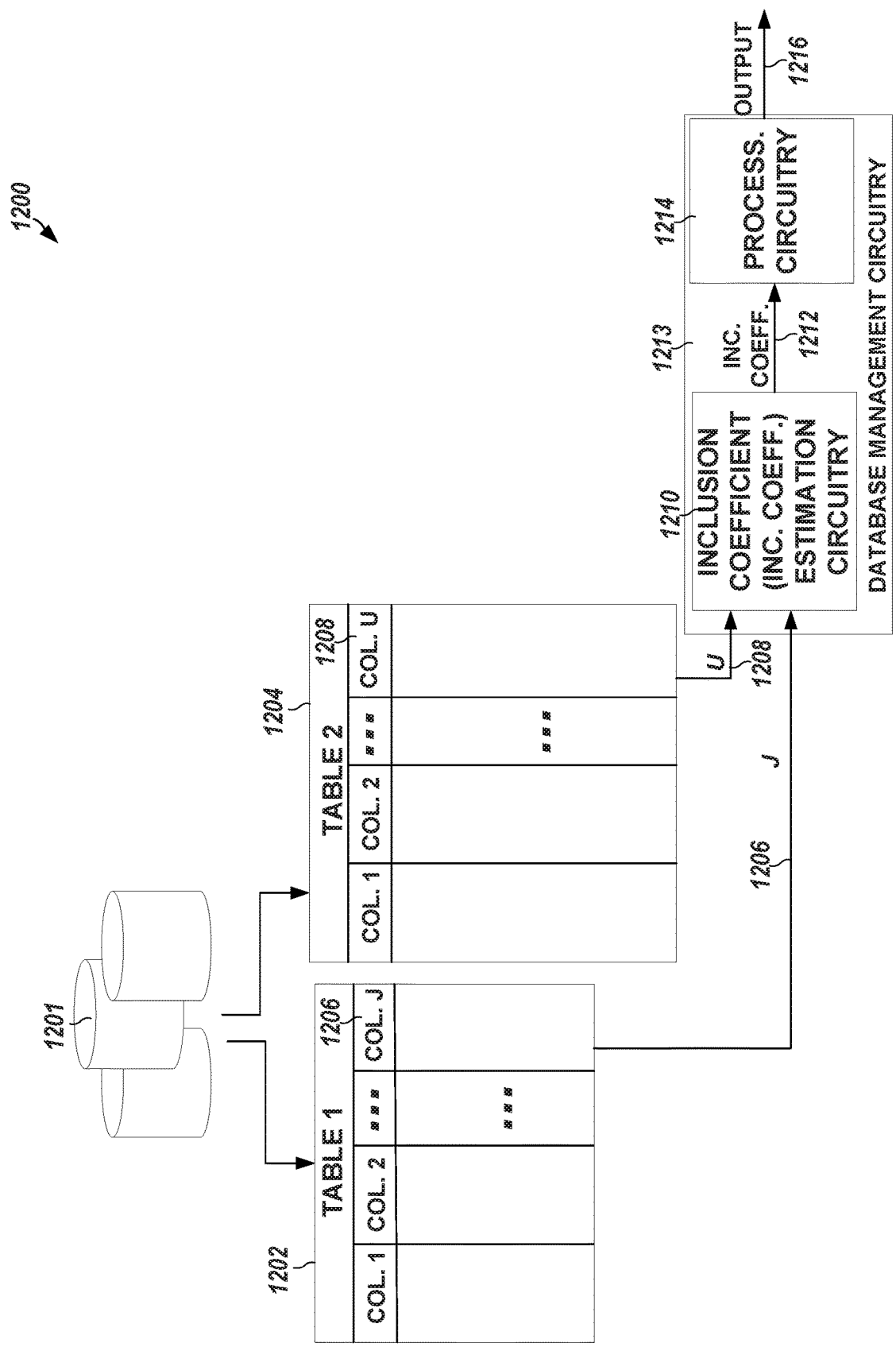
FIG. 10 illustrates, by way of example, a block diagram of an embodiment of a system for inclusion coefficient determination and use.
Figure 11:
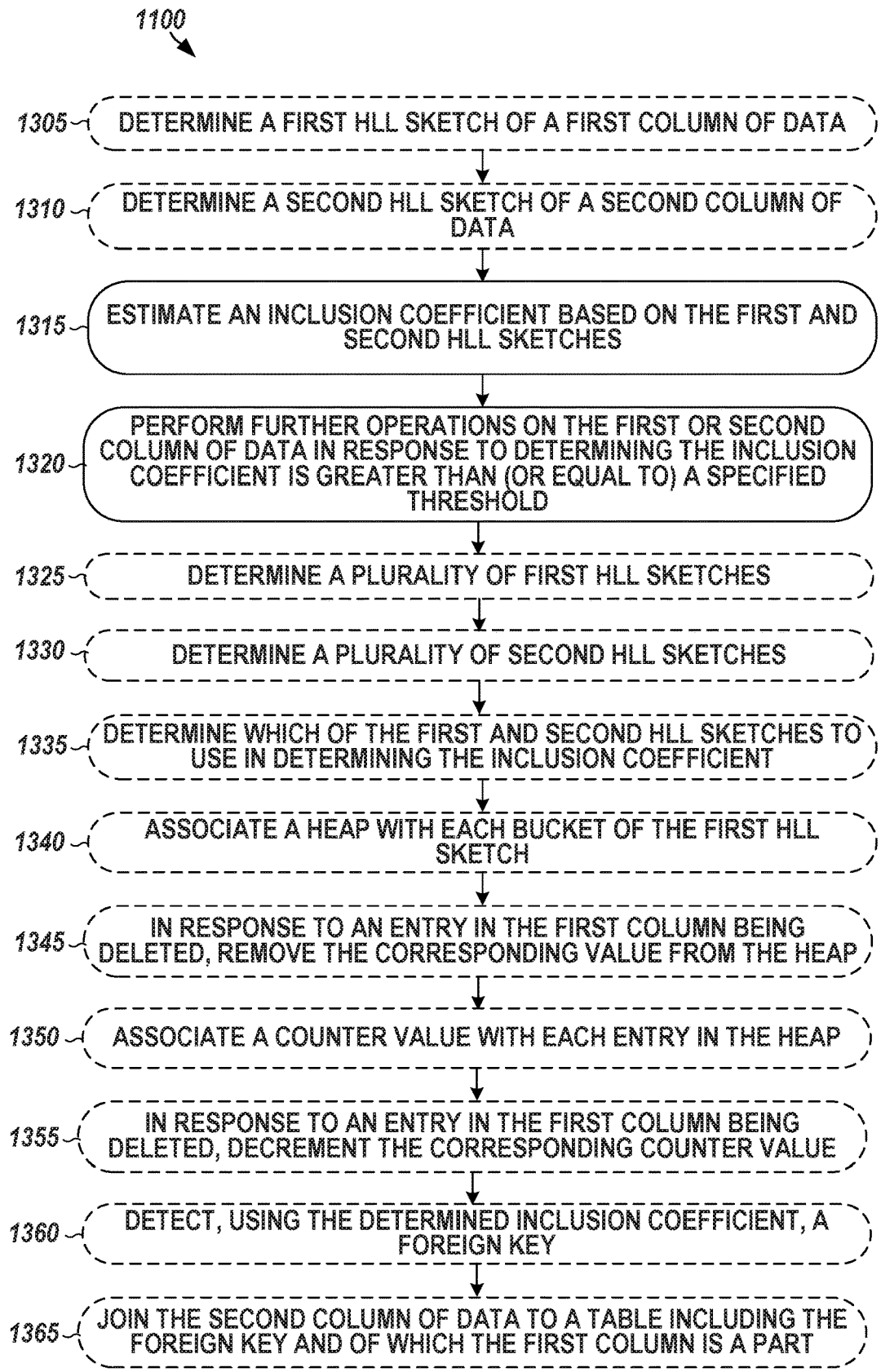
FIG. 11 illustrates, by way of example, a flowchart of an embodiment of a method for database management.
Figure 12:
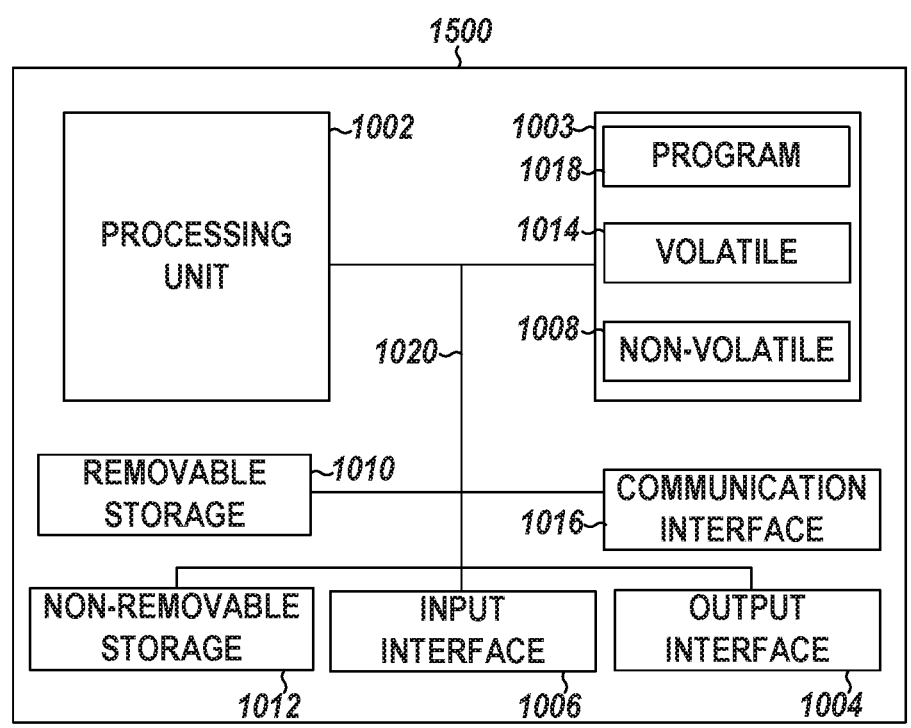
FIG. 12 illustrates, by way of example, a block diagram of an embodiment of a machine (e.g., a computer system) to implement one or more embodiments.

Embodiments of the HLL sketch construction technique may be modified such that, for each bucket, all $\rho(s_i)$ are tracked to support deletion. Since $V_j^X$ is the max over all those values, and when a deletion happens knowing the second largest for each bucket is crucial, as shown in FIG. 9, rather than only keeping the maximum value in each bucket, all $\rho(s_i)$ may be maintained in a max-heap. It may be shown that, by maintaining a heap of constant size (at most l) for each bucket, incremental deletion may be supported. Recall that during HLL sketch construction, a hash function h: $dom(X) \rightarrow (\{0, 1\}l$ is applied on each $X[i] \in dom(X)$ which returns t bits $s_i$, and if m is the number of bits for the buckets, $\rho(s_i)$ is always an integer number smaller than equal $l-m$ ($1 \leq \rho(s_i) \leq l-m$). For example, if the technique uses a 64-bit hash function and $m=0$, then $1 \leq \rho(s_i) \leq 64$. In the worst case, if all distinct $\rho(s_i)$s are kept, only $l-m$ values are kept, which requires $(l-m)\log(l-m)$ bits. This explains why, with only a heap of constant size (at most $l-m$) incremental deletion may be supported.

One issue includes the possibility that $X[i]$ and $X[k]$ are assigned to same bucket $b_j$ and $\rho(s_i)$ is equal to $\rho(s_j)$. In this case, if $V_j^X = \rho(s_i)$ and $X[i]$ is deleted, the value of bucket $b_j$ ($V_j^X$) should still be $\rho(s_i)$ because $X[k] \in \text{dom}(X)$ still exists and $\rho(s_j) = \rho(s_i)$. To handle this scenario and keep the max heap size still limited to $l-m$, a counter may be maintained for each node in heap. For example, consider a node with only one $X[i]$ and a $\rho(s_i)=4$, a counter with value 1 may be associated with node 4. So, a node in heap may be deleted if the counter is one, otherwise the counter may be decremented by one.

Space Complexity

For each bucket $b_j$, the heap size is at most $l-m$ and each value in the heap is an integer number at most $l-m$. Thus, each bucket only needs $(l-m) \log (l-m)$ bits. Thus, total memory to store the sketch $S_X$ is $O(2^m(l-m) \log (l-m))$. Since the space complexity of the original HLL is $O(2^m \log (l-m))$, with a constant overhead, this technique provides deletion support.

When the database schema and data sizes are large, computing the inclusion coefficient for many pair of columns in the database may be both computationally expensive and memory intensive. This challenge is addressed in embodiments using only bounded-memory sketches of the data. Given a fixed budget of memory per column, the data is scanned once, and one or more data sketches that fit within the memory budget is computed.

FIG. 13 illustrates, by way of example, a diagram of an embodiment of a system 1300 for inclusion coefficient estimation. The system 1300 as illustrated includes one or more databases 1201, multiple tables 1202 and 1204, and database management circuitry 1213. The database management circuitry 1213 as illustrated includes inclusion coefficient estimation circuitry 1210 and processing circuitry 1214. While the system 1200 includes two tables 1202 and 1204, an inclusion coefficient may be estimated based on two columns of the same table, rather than two columns of different tables. The tables 1202 and 1204 may be from same or different, respective, databases 1201. Each of the tables 1202 and 1204 includes a plurality of columns, but may alternatively include only a single column. In the embodiment illustrated, it is desired to determine an inclusion coefficient 1212 for a first column 1206 of the first table 1202 and a second column 1208 of the second table 1204. A sketch of each of the first column 1206 and the second column 1208 may be stored in the database 1201, or computed by the inclusion coefficient estimation circuitry 1210.

The inclusion coefficient estimation circuitry 1210 receives the first column 1206 and the second column 1208 (or sketches of the columns 1206 and 1208) and produces the inclusion coefficient 1212. The inclusion coefficient 1212 may be produced using the methods 300 and 400, or the like. The inclusion coefficient 1212 may be a desired result, if the desired result is an indication of similarity between columns of data. If a different result is desired, such as FK detection or other result that operates on the inclusion coefficient, the inclusion coefficient 1212 may be used as input to processing circuitry 1214 that provides an output 1216 based on the inclusion coefficient 1212. For example, the processing circuitry 1214 may perform FK detection based on the inclusion coefficient 1212. The processing circuitry 1214 may perform a data merge or join based on the inclusion coefficient 1212. A data merge or join may include adding data to a column, adding another column of data to a table, or the like.

The inclusion coefficient estimation circuitry 1210 or the processing circuitry 1214 may include electric and/or electronic components (e.g., one or more transistors, resistors, capacitors, inductors, amplifiers, modulators, demodulators, antennas, radios, regulators, diodes, oscillators, multiplexers, logic gates, buffers, caches, memories, GPUs, CPUs, FPGAs, ASICs, or the like), or software operating on a computing device.

FIG. 14 illustrates, by way of example, a diagram of an embodiment of a method 1400 for database management. The method 1400 may be performed by one or more of the components of the system 1200 or the computing device 1500. The operations of the method 1400 are not in a specific order. The operations of the method 1400 in dashed boxes are optional. The method 1400 as illustrated includes determining a first HLL sketch of a first column of data, at operation 1305; determining a second HLL sketch of a second column of data, at operation 1310; estimating an inclusion coefficient based on the first and second HLL sketches, at operation 1315; and performing further operations on the first column of data or the second column of data in response to determining the inclusion coefficient is greater than, or equal to, a specified threshold, at operation 1320. The operations 1305 and 1310 may include operations of the method 100, among others.

The method 1400 may further include wherein, the first sketch includes respective first hash values in first buckets. The method 1400 may further include, wherein the second sketch includes respective second hash values in second buckets. The operation 1315 may further include determining a probability that a second hash value of the second hash values in a second bucket of the second buckets of the second sketch is less than, or equal to, a first hash value of the first hash values in a corresponding first bucket of the first buckets of the first sketch. The operation 1315 may further include further include using the determined probability as input to an inverse of a function of the probability versus the inclusion coefficient. The operation 1315 may further include, wherein determining the inclusion coefficient includes using a binomial search of the inverse of the function of the probability versus the inclusion coefficient.

The method 1400 may further include determining a plurality of first HLL sketches, wherein each of the first HLL sketches includes a different number of buckets and the first sketch is one of the first HLL sketches, at operation 1325. The method 1400 may further include determining a plurality of second HLL sketches, wherein each of the second HLL sketches includes a different number of buckets and the first sketch is one of the second HLL sketches, at operation 1330. The method 1400 may further include determining which of the first sketches and second sketches to use in determining the inclusion coefficient based on the maximum of the number of distinct values in the first column and the number of distinct values in the second column, at operation 1335.

The method 1400 may further include associating a heap with each bucket of the first HLL sketch, the heap including values of the bucket to which data of the first column hashes in descending order, at operation 1340. The method 1400 may further include in response to an entry in the first column being deleted, removing the corresponding value from the heap, at operation 1345. The method 1400 may further include associating a counter value with each entry in the heap, the counter value indicating the number of values in the row that hash to the corresponding value, at operation 1350. The method 1400 may further include, in response to an entry in the first column being deleted, decrementing the corresponding counter value, at operation 1355.

The method 1400 may further include detecting, using the determined inclusion coefficient, a foreign key, at operation 1360. The method 1400 may further include joining the second column of data to a table including the foreign key and of which the first column is a part, at operation 1365.

SUMMARY

Embodiments of an inclusion coefficient estimator with low error and using bounded-memory sketches is described. A hardness result is established showing that any estimator that relies only on sketches with bounded memory must incur unbounded error in certain cases. Intuitively, the difficult cases are when column X has small cardinality and column Y has large cardinality or vice-versa. These difficult cases appear to be quite common in the "real-world" databases.

The new inclusion coefficient estimator is termed BML (Binomial Mean Lookup) and may be determined based on HLL sketches. HLL sketches may be computed efficiently and within a given memory budget, requiring invocation of only a single hash function for each value in the column. HLL sketches are becoming increasingly popular for estimating cardinality in different applications, and are even being adopted in commercial database engines. The BML estimator is based on a theoretical result that establishes a mapping from the inclusion coefficient to the probability that the value of a bucket in the HLL sketch of column Y is greater than the value of the corresponding bucket in the HLL sketch of column X. BML, is based on maximum likelihood estimation (MLE) method. BML observes the number of buckets in the HLL sketch of column Y whose HLL value is greater than the HLL value of the corresponding bucket in column X, and it returns the inclusion coefficient of X and Y that maximizes the likelihood of this observation. As a by-product of the estimation technique, a bound on the error is also provided. This error bound is data-dependent (it is specific to the pair of columns X and Y). Such an error bound may be valuable to applications that consume the estimates, and is not provided by prior techniques.

HLL sketches may be maintained incrementally in the presence of insertions. An independent contribution of embodiments is a technique for incrementally maintaining an HLL sketch in the presence of data deletions with constant memory overhead. Each bucket in an HLL sketch always holds an integer value less than a constant, the number of bits of the hash value. By maintaining a max-heap of constant size for each bucket incremental deletion may be supported.

One application of inclusion coefficients, namely the problem of foreign-key detection in a database is explored. Prior work on foreign-key detection relies on exact inclusion coefficients to prune the foreign-key candidates. It is shown empirically on several real-world and benchmark databases that the estimation error of BML is acceptable for these foreign-key detection techniques. In other words, replacing the exact inclusion coefficient with an estimate obtained via the BML estimator has no noticeable impact on the precision and recall of these foreign-key detection algorithms.

FIG. 15 illustrates, by way of example, a block diagram of an embodiment of a machine 1500 (e.g., a computer system) to implement one or more embodiments of database management. The database management may include storing the data sets and performing methods and algorithms to estimate inclusion coefficients using memory and computing resources efficiently. The database management may include using the estimates to perform operations that are better or more efficiently performed using the estimates, such as foreign key detection, data profiling and data integration. All components need not be used in various embodiments.

One example computing device in the form of a computer 1400 may include a processing unit 1002, memory 1003, removable storage 1010, and non-removable storage 1012. Although the example computing device is illustrated and described as computer 1500, the computing device may be in different forms in different embodiments. For example, the computing device may instead be a smartphone, a tablet, smartwatch, or other computing device including the same or similar elements as illustrated and described with regard to FIG. 14. Devices, such as smartphones, tablets, and smartwatches, are generally collectively referred to as mobile devices or user equipment. Such devices may be worn separately from, or integrated into the wearable device incorporating light delivering devices. Further, although the various data storage elements are illustrated as part of the computer 1500, the storage may also or alternatively include cloud-based storage accessible via a network, such as the Internet or server based storage.

Memory 1003 may include volatile memory 1014 and non-volatile memory 1008. Computer 1500 may include—or have access to a computing environment that includes—a variety of computer-readable media, such as volatile memory 1014 and non-volatile memory 1008, removable storage 1010 and non-removable storage 1012. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 1500 may include or have access to a computing environment that includes input interface 1006, output interface 1004, and a communication interface 1016. Output interface 1004 may include a display device, such as a touchscreen, that also may serve as an input device. The input interface 1006 may include one or more of a touchscreen, touchpad, mouse, keyboard, camera, one or more device-specific buttons, one or more sensors integrated within or coupled via wired or wireless data connections to the computer 1500, and other input devices. The computer may operate in a networked environment using a communication connection to connect to one or more remote computers, such as database servers. The remote computer may include a personal computer (PC), server, router, network PC, a peer device or other common DFD network switch, or the like. The communication connection may include a Local Area Network (LAN), a Wide Area Network (WAN), cellular, WiFi, Bluetooth, or other networks. According to one embodiment, the various components of computer 1500 are connected with a system bus 1020.

Computer-readable instructions stored on a computer-readable medium are executable by the processing unit 1002 of the computer 1400, such as a program 1018. The program 1018 in some embodiments comprises software that, when executed by the processing unit 1002, performs operations according to any of the embodiments included herein. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage, such as a storage area network (SAN). Computer program 1018 may be used to cause processing unit 1002 to perform one or more methods or algorithms described herein.

ADDITIONAL NOTES AND EXAMPLES

Example 1 includes a system for managing database data comprising at least one database including a first column of data and a second column of data stored thereon database management circuitry to receive the first and second columns of data, determine a first hyperloglog (HLL) sketch of a first column of data, determine a second HLL sketch of a second column of data, estimate an inclusion coefficient based on the first and second HLL sketches, and perform operations on the first column of data or the second column of data of the database in response to a determination the inclusion coefficient is greater than, or equal to, a specified threshold.

In Example 2, Example 1 can further include, wherein the first sketch includes respective first hash values in first buckets, the second sketch includes respective second hash values in second buckets, and determination of the inclusion coefficient further includes determining a probability that a second hash value of the second hash values in a second bucket of the second buckets is less than, or equal to, a first hash value of the first hash values in a corresponding first bucket of the first buckets.

In Example 3, Example 2 can further include, wherein determination of the inclusion coefficient further includes using the determined probability as input to an inverse of a function of the probability versus the inclusion coefficient.

In Example 4, Example 3 may further include, wherein determination of the inclusion coefficient includes using a binary search of the inverse of the function of the probability versus the inclusion coefficient.

In Example 5, at least one of Examples 3-4 may further include, wherein the database management circuitry is further to determine a plurality of first HLL sketches, wherein each of the first HLL sketches includes a different number of buckets and the first sketch is one of the first HLL sketches, determine a plurality of second HLL sketches, wherein each of the second HLL sketches includes a different number of buckets and the first sketch is one of the second HLL sketches, and determine which of the first sketches and second sketches to use in determining the inclusion coefficient based on the maximum of the number of distinct values in the first column and the number of distinct values in the second column.

In Example 6, at least one of Examples 3-5 may further include, wherein the database management circuitry is further to associate a heap with each bucket of the first HLL sketch, the heap including values of the bucket to which data of the first column hashes in descending order, and in response to an entry in the first column being deleted, remove the corresponding value from the heap.

In Example 7, Example 6 may further include, wherein the database management circuitry is further to associate a counter value with each entry in the heap, the counter value indicating the number of values in the row that hash to the corresponding value, and in response to an entry in the first column being deleted, decrement the corresponding counter value.

In Example 8, at least one of Examples 1-7 may further include, wherein the database management circuitry is further to, using the determined inclusion coefficient, detect a foreign key, perform data profiling, or perform data integration.

In Example 9, Example 8 may further include, wherein the database management circuitry is further to join the second column of data to a table including the foreign key and of which the first column is a part.

Example 10 includes a (non-transitory) machine-readable medium including instructions stored thereon that, when executed by a machine, configure the machine to perform operations comprising receiving a first hyperloglog (HLL) sketch of a first column of data, receiving a second HLL sketch of a second column of data, estimating an inclusion coefficient based on the first and second HLL sketches, and performing operations on the first column of data or the second column of data in response to determining the inclusion coefficient is greater than, or equal to, a specified threshold.

In Example 11, Example 10 may further include, wherein the first sketch includes respective first hash values in first buckets, the second sketch includes respective second hash values in second buckets, and determining the inclusion coefficient further includes determining a probability that a second hash value of the second hash values in a second bucket of the second buckets of the second sketch is less than, or equal to, a first hash value of the first hash values in a corresponding first bucket of the first buckets of the first sketch.

In Example 12, Example 11 may further include, wherein determining the inclusion coefficient further includes using the determined probability as input to an inverse of a function of the probability versus the inclusion coefficient.

In Example 13, Example 12 may further include, wherein determining the inclusion coefficient includes using a binary search of the inverse of the function of the probability versus the inclusion coefficient.

In Example 14, at least one of Examples 12-13 may further include determining a plurality of first HLL sketches, wherein each of the first HLL sketches includes a different number of buckets and the first sketch is one of the first HLL sketches, determining a plurality of second HLL sketches, wherein each of the second HLL sketches includes a different number of buckets and the first sketch is one of the second HLL sketches, and determining which of the first sketches and second sketches to use in determining the inclusion coefficient based on the maximum of the number of distinct values in the first column and the number of distinct values in the second column.

Example 15 includes a method of database management, the method comprising determining a first hyperloglog (HLL) sketch of a first column of data, determining a second HLL sketch of a second column of data, estimating an inclusion coefficient based on the first and second HLL sketches, detecting, using the determined inclusion coefficient, a foreign key, and joining the second column of data to a table including the foreign key and of which the first column is a part.

In Example 16, Example 15 may further include associating a heap with each bucket of the first HLL sketch, the heap including values of the bucket to which data of the first column hashes in descending order, and in response to an entry in the first column being deleted, removing the corresponding value from the heap.

In Example 17, Example 16 may further include associating a counter value with each entry in the heap, the counter value indicating the number of values in the row that hash to the corresponding value, and in response to an entry in the first column being deleted, decrementing the corresponding counter value.

In Example 18, at least one of Examples 15-17 may further include, wherein the first sketch includes respective first hash values in first buckets, the second sketch includes respective second hash values in second buckets, determining the inclusion coefficient further includes determining a probability that a second hash value of the second hash values in a second bucket of the second buckets of the second sketch is less than, or equal to, a first hash value of the first hash values in a corresponding first bucket of the first buckets of the first sketch, and determining the inclusion coefficient further includes using the determined probability as input to an inverse of a function of the probability versus the inclusion coefficient.

In Example 19, Example 18 may further include, wherein determining the inclusion coefficient includes using a binary search of the inverse of the function of the probability versus the inclusion coefficient.

In Example 20, at least one of Examples 18-19 may further include determining a plurality of first HLL sketches, wherein each of the first HLL sketches includes a different number of buckets and the first sketch is one of the first HLL sketches, determining a plurality of second HLL sketches, wherein each of the second HLL sketches includes a different number of buckets and the first sketch is one of the second HLL sketches, and determining which of the first sketches and second sketches to use in determining the inclusion coefficient based on the maximum of the number of distinct values in the first column and the number of distinct values in the second column.

Although a few embodiments have been described in detail above, other modifications are possible. For example, the logic flows depicted in the figures do not require the order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A system for managing database data comprising:
   at least one database including a first column of data and a second column of data stored thereon;
   database management circuitry to:
      receive the first and second columns of data;
      determine a first hyperloglog (HLL) sketch of a first column of data, the first sketch including respective first hash values in first buckets;
      determine a second HLL sketch of a second column of data, the second sketch including second respective second hash values in second buckets; and
      estimate, using a binomial mean lookup (BML)) based on a maximum likelihood estimation (MLE) that provides a likelihood of the number of second buckets whose respective hash values is greater than first hash values in corresponding first buckets, an inclusion coefficient based on the first and second HLL sketches; and
      perforin operations on the first column of data or the second column of data of the database in response to a determination the inclusion coefficient is greater than, or equal to, a specified threshold.

2. The system of claim 1, wherein determination of the inclusion coefficient further includes using the determined probability as input to an inverse of a function of the probability versus the inclusion coefficient.

3. The system of claim 2, wherein determination of the inclusion coefficient includes using a binary search of the inverse of the function of the probability versus the inclusion coefficient.

4. The system of claim 2, wherein the database management circuitry is further to:
   determine a plurality of first HLL sketches, wherein each of the first HLL sketches includes a different number of buckets and the first sketch is one of the first HLL sketches;
   determine a plurality of second HLL sketches, wherein each of the second HLL sketches includes a different number of buckets and the first sketch is one of the second HLL sketches; and
   determine which of the first sketches and second sketches to use in determining the inclusion coefficient based on the maximum of the number of distinct values in the first column and the number of distinct values in the second column.

5. The system of claim 1, wherein the database management circuitry is further to:
   associate a heap with each bucket of the first HLL sketch, the heap including values of the bucket to which data of the first column hashes in descending order; and
   in response to an entry in the first column being deleted, remove the corresponding value from the heap.

6. The system of claim 5, wherein the database management circuitry is further to:
   associate a counter value with each entry in the heap, the counter value indicating the number of values in the row that hash to the corresponding value; and
   in response to an entry in the first column being deleted, decrement the corresponding counter value.

7. The system of claim 1, wherein the database management circuitry is further to, using the determined inclusion coefficient, detect a foreign key, perform data profiling, or perform data integration.

8. The system of claim 7, wherein the database management circuitry is further to join the second column of data to a table including the foreign key and of which the first column is a part.

9. A non-transitory machine-readable medium including instructions stored thereon that, when executed by a machine, configure the machine to perform operations comprising:
   receiving a first hyperloglog (HLL) sketch of a first column of data, the first sketch including respective first hash values in first buckets;
   receiving a second HLL sketch of a second column of data, the second sketch including second respective second hash values in second buckets;
   estimating, using a binomial mean lookup (BML) estimator based on a maximum likelihood estimation (MLE) that provides a likelihood of the number of second buckets whose respective hash values is greater than first hash values in corresponding first buckets. an inclusion coefficient based on the first and second HLL sketches; and performing operations on the first column of data or the second column of data in response to determining the inclusion coefficient is greater than, or equal to, a specified threshold.

10. The non-transitory machine-readable medium of claim 9, wherein determining the inclusion coefficient further includes using the determined probability as input to an inverse of a function of the probability versus the inclusion coefficient.

11. The non-transitory machine-readable medium of claim 10, wherein determining the inclusion coefficient includes using a binary search of the inverse of the function of the probability versus the inclusion coefficient.

12. The non-transitory machine-readable medium of claim 10, further comprising:

determining a plurality of first HLL sketches, wherein each of the first HLL sketches includes a different number of buckets and the first sketch is one of the first HLL sketches;

determining a plurality of second HLL sketches, wherein each of the second HLL sketches includes a different number of buckets and the first sketch is one of the second HLL sketches; and determining which of the first sketches and second sketches to use in determining the inclusion coefficient based on the maximum of the number of distinct values in the first column and the number of distinct values in the second column.

13. A method of database management, the method comprising:

determining a first hyperloglog (HLL) sketch of a first column of data, the first sketch including respective first hash values in first buckets;

determining a second HLL sketch of a second column of data, the second sketch including second respective second hash values in second buckets;

estimating, using a binomial mean lookup (BML) estimator based on a maximum likelihood estimation (MLE) that provides a likelihood of the number of second buckets whose respective hash values is greater than first hash values in corresponding first buckets, an inclusion coefficient based on the first and second HLL sketches;

detecting, using the determined inclusion coefficient, a foreign key; and joining the second column of data to a table including the foreign key and of which the first column is a part.

14. The method of claim 13, further comprising:

associating a heap with each bucket of the first HLL sketch, the heap including values of the bucket to which data of the first column hashes in descending order; and in response to an entry in the first column being deleted, removing the corresponding value from the heap.

15. The method of claim 14, further comprising:

associating a counter value with each entry in the heap, the counter value indicating the number of values in the row that hash to the corresponding value; and in response to an entry in the first column being deleted, decrementing the corresponding counter value.

16. The method of claim 13, wherein determining the inclusion coefficient further includes using the determined probability as input to an inverse of a function of the probability versus the inclusion coefficient.

17. The method of claim 16, wherein determining the inclusion coefficient includes using a binary search of the inverse of the function of the probability versus the inclusion coefficient.

18. The method of claim 16, further comprising:

determining a plurality of first HLL sketches, wherein each of the first HLL sketches includes a different number of buckets and the first sketch is one of the first HLL sketches;

determining a plurality of second HLL sketches, wherein each of the second HLL sketches includes a different number of buckets and the first sketch is one of the second HLL sketches; and determining which of the first sketches and second sketches to use in deter mining the inclusion coefficient based on the maximum of the number of distinct values in the first column and the number of distinct values in the second column.

* * * * *